United States Patent [19]
Lee

[11] Patent Number: 5,347,477
[45] Date of Patent: Sep. 13, 1994

[54] PEN-BASED FORM COMPUTER

[76] Inventor: Jack Lee, 2nd Fl., 38, Ching Hsing Rd., Wen Shan Distr., Taipei, Taiwan

[21] Appl. No.: 25,188

[22] Filed: Mar. 2, 1993

Related U.S. Application Data

[63] Continuation-in-part of Ser. No. 826,900, Jan. 28, 1992, abandoned.

[51] Int. Cl.⁵ ............................................. G06F 1/00
[52] U.S. Cl. ......................... 364/709.11; 364/709.01
[58] Field of Search .............. 364/706, 709.01, 709.02, 364/709.04, 709.06, 709.11, 709.13; 382/13, 14

[56] References Cited
U.S. PATENT DOCUMENTS

| | | | |
|---|---|---|---|
| 4,475,239 | 10/1984 | Van Raamsdonks | 382/57 |
| 4,545,023 | 10/1985 | Mizzi | 364/709.13 |
| 4,855,725 | 8/1989 | Fernandez | 345/173 |
| 4,972,496 | 11/1990 | Sklarew | 382/13 |
| 5,133,076 | 7/1992 | Hawkins et al. | 364/709.09 |
| 5,199,104 | 3/1993 | Hirayama | 395/145 |

Primary Examiner—Jerry Smith
Assistant Examiner—Chuong D. Ngo
Attorney, Agent, or Firm—Bucknam and Archer

[57] ABSTRACT

A pen-based form computer using "Form" as the operation metaphor between users and the computer, which allows an user to directly operate the information stored in the computer or any remote systems without learning commands, file names, file types, and other details regarding computer internal structure. It is applicable for use in medical prescription control, order registration control, inventory inquiry control, data collection. It can also be used as a front-end system in a client and server structure. The pen-based form computer comprises a pen for data entry, and a complete Multi-tasking Preemptive Pen Based Form Operation software system for form operation metaphor, graphical form making procedure, multiple form data association, multiple form operation language, remote form data accessing, automatic database association, and hand-writing recognition. External keyboard for data entry is acceptable. The preferred embodiment of the invention is within 2 lbs and about the size of a B5 paper. It uses a pressure-sensitive touch panel overlaid LCD for data entry with the pen, and an infrared, RS-232, off-the-shelf modem, and radio transceiver as communication mediums.

4 Claims, 27 Drawing Sheets

| | | |
|---|---|---|
| 90 | V (EDIT) | to enter data |
| 91 | CIRCLE (MARK) | to mark a port or a character string |
| 92 | INSERT | to paste the marked data over here |
| 93 | ERASE | to erase data on a port |
| 94 | CROSS OUT | to exit or cross out something |
| 95 | SELECT (POINT) | to select or activate somethings |
| 96 | SWAP | to swap two character string, or to get a new line |
| 97 | FLICK UP | to scroll up within a port |
| 98 | FLICK DOWN | to scroll down within a port |
| 99 | FLICK RIGHT | to scroll right within a port |
| 100 | FLICK LEFT | to scroll left within a port |

FIG. 11

⟨ var ⟩ ::= {(A-Z)| - | $| (0-9)} {(A-Z) | - | $ | (0-9) | ⟨ Var ⟩ }

⟨ string ⟩ ::= {(All Ascll)....}

⟨ Floating ⟩ ::= [+ | -] {(0-9)....} . {(0-9)...}

⟨ Integer ⟩ ::= [+ | -] (0-9) {(0-9)...}

⟨ Constant ⟩ ::= ⟨ Integer ⟩ | ⟨ Floating ⟩ | " ⟨ String ⟩ "

⟨ Local Var ⟩ ::= ⟨ Var ⟩ | ⟨ Var ⟩ { ⟨ Local Var ⟩ }

⟨ Declaration ⟩ ::= PRIVATE ⟨ Local Var ⟩

⟨ Parameter ⟩ ::= ⟨ Var ⟩ | ⟨ Constant ⟩ | ⟨ Parameter ⟩

{ ⟨ Parameter ⟩ }

⟨ Function ⟩ ::= ⟨ Command ⟩ ⟨ Parameter ⟩

⟨ Statement ⟩ ::= ⟨ Var ⟩ = ⟨ Var ⟩ |

⟨ Var ⟩ = ⟨ Constant ⟩ |

⟨ Function ⟩ | ⟨ Control ⟩

⟨ op ⟩ ::= + | - | * | /

⟨ Evaluation ⟩ ::= ⟨ Var ⟩ | ⟨ Constant ⟩ | { [ ⟨ Evaluation ⟩

⟨ OP ⟩ ⟨ Evaluation ⟩ ] ⟨ OP ⟩ ⟨ Evaluation ⟩ }

⟨ Var I ⟩ ::= ⟨ Var ⟩

⟨ Control ⟩ ::= DO WHILE ⟨ Evaluation ⟩

{ ⟨ Statement ⟩ .... } ENDDO |

DO CASE ⟨ Var I ⟩ { {CASE ⟨ Var I ⟩ = ⟨ Evaluation ⟩

{ ⟨ Statement ⟩ ... } } ... } {OTHERWISE { ⟨ Statement ⟩ ... } }

ENDCASE |

IF ⟨ Evaluation ⟩ { ⟨ Statement ⟩ ... } ELSE { ⟨ Statement ⟩ .... }

ENDIF

FIG. 20A

⟨ Command ⟩ ::= ADDDOMAIN | ALARM | CD |

COMMATCMD | COMMCLOSE | COMMDOSCMD | COMMGCD |

COMMGDFREE | COMMGDIR | COMMGDRIVES | COMMGETFILES |

COMMGETSTR | COMMGFILES | COMMOPEN | COMMSENDFILE |

COMMSENDSTR | COMMSET |

COPY | DBAVERAGS | DBBEGIN | DBBOTTOM | DBCLOSE |

DBCOPY0 | DBCOUNT | DBCURREC | DBDELETE | DBEDITINDEX |

DBEDITOR | DBEND | DBERROR | DBEXIST | DBFADD |

DBFDECIDBFDELETE | DBFFREE | DBFGET | DBFILTER |

DBFLDCOUNT | DBFLIST | DBFLUSH | DBFTYPE |

DBFWRITE | DBGOTO | DBHEADER | DBINDEX |

DBISDELETED | DBJUMP | DBLOCATE | DBMAX |

DBMIN | DBMORE | DBRADD | DBRECALL | DBSKIP |

DBTOP | DBTOTAL |

DEL |

DIALCLOSE | DIALEDIT | DIALOPEN |

DIRCOPY | DIRDEL |

FORMMAKER | FORMTODBF | GRAPHEDITOR |

LSARNPAD |

MD | PRINT | RD | SCPGEN | SS | TEXTEDITOR |

TYPE

FIG. 20B

PEN-BASED FORM COMPUTER

This is a continuation in part of application Ser. No. 07/826,990, filed on Jan. 28, 1992, now abandoned.

BACKGROUND OF THE INVENTION

The present invention relates to a mobile computers, and relates more particularly to a hand-held pen-based form computer.

A variety of mobile computers, including the Notebook PCs, are well accepted and in use for the advantages of mobility. They can be classified into two categories basically: a general purposed personal computer or a dedicated one fixed for certain applications. The former normally would need the users to know the "commands", system hardware and software configurations to do jobs, while the later can only do the hobs predefined by the vendors. An in both cases, a very high level of concentration is needed for the interactions with the computers. These have become a major barrier for people in all ages to use the computer.

After a complete analysis, it is found that over 70% of today's applications in the personal computing environment can be properly down with "GENERALIZED FORMS" consisting of "PORTS" with different attributes ranging from text, array, graphics, bitmapped, etc. Further, the Form is much easier to understand for the people than the traditional "Computer Files". It also provides a more intuitive human interface similar to those printed forms encountered by most people from day to day. The information presented in a form type is made for certain purposes which can be properly taken as applications objects, so that all personal information processing can be operated in a "object basis". With the internal object-oriented designs mapping to the rear world applications, the user can therefore apply information with less effort in fighting the above mentioned barriers.

With gestures, characters and patterns written with a "pen" on the computer, the operations can be even simplified so that users are able to spare the concentrations for some other issues while they are using the "Pen-based Form computer".

Further, a variety of forms may be used in our daily life. Actually, a form is a collection of different data gathered according to a certain purpose. Therefore, it can be utilized in data entry or display, as well as in regular computer applications such as controls, operations, and edits. Because it is topic-oriented, users can immediately know how to use it once saw it.

Among mobile computers, a pen computer is relatively easier to operate. A pen computer uses a pen for data entry, and allows information display and enter date to be done by means of a form or forms. Similar to regular notebook and desktop computers, regular pen computers are also of general purpose design. Users still have to pay much in learning the hardware and software structures of a pen computer before using it. Further, regular form operations are available for display and enter data only. They still can not fully utilize the characteristics of form metaphor and process user information and system operation information by form. In addition to the aforesaid drawbacks, regular notebook and desktop computers will cause certain operation problems due to the use of a keyboard for data entry. There are still small data collectors specifically designed for collecting data. These data collectors provide less flexibility in hardware and software structures, and commonly use a small single-handed keyboard for data entry, and therefore their application is limited.

SUMMARY OF THE INVENTION

The present invention provides a hand-held mobile computer, of which the operation interface, operations and controls, display and input, are all processed through a Form metaphor. All data needed in Form can be obtained from local or any other remote computers. Accessing remote computer can be achieved through infrared, RF (radio frequency), RS-232, or modem. Data input can be done by means of pen input through the operation of a handwriting recognition process. An external keyboard and IC memory cards may be connected to the system.

BRIEF DESCRIPTION OF THE DRAWINGS

The present invention will now be described by way of example only with reference to the annexed drawings, in which:

FIG. 11 shows the control gestures, their titles and definitions;

FIGS. 20A and 20B show the syntax and grammar of the scripting language according to the present invention;

DETAILED DESCRIPTION OF THE PREFERRED EMBODIMENT

Referring to FIG. 1, therein illustrated are five ways to hold a pen-based form computer according to the present invention. The outer shell of the pen-based form computer is an ergonomic mechanic design which fits smoothly fits over the wrist for comfortable holding with one hand. The smoothly curved outer shell of the pen-based form computer allows itself to be stopped against the waist when it is being held with one hand, or conveniently picked up from the desk with one hand.

Figure 2:
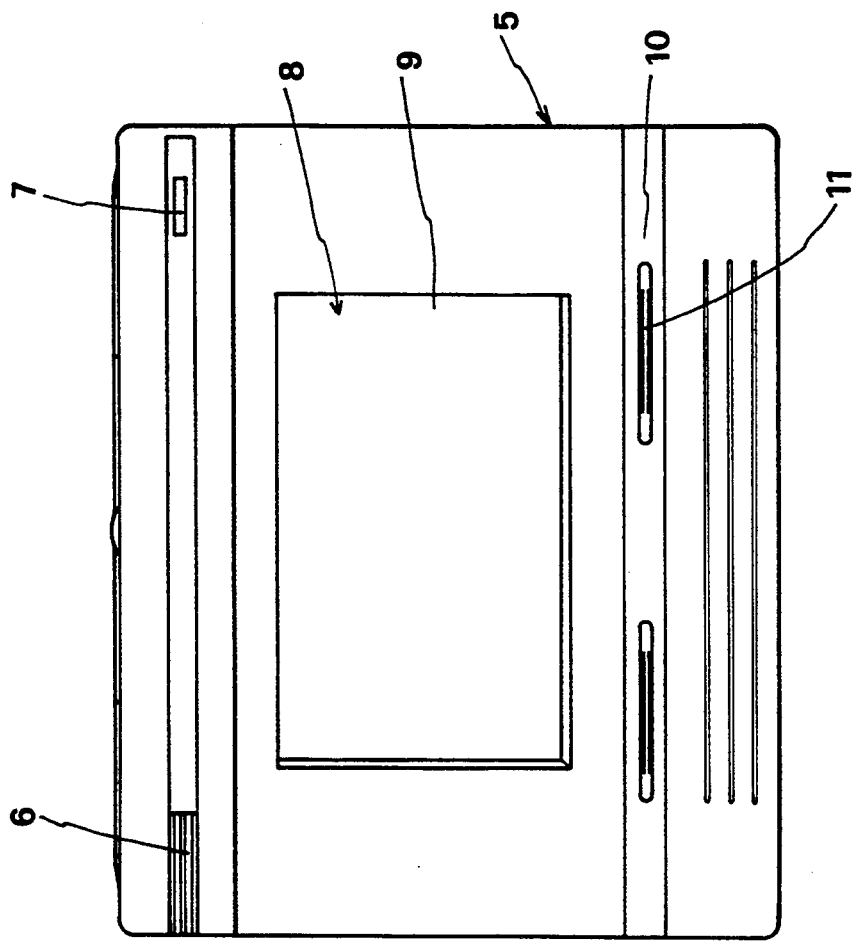
FIG. 2 is a top view of a pen-based form computer embodying the present invention.

Referring to FIG. 2, therein illustrated is the top view of the Pen Based Form Computer. The Pen Based Form Computer is referenced by 5, comprising a pressure-sensitive touch panel 8 overlaid LCD 9 for data output display, a power indicator 7, a speaker 6, a pen rest 10 with a snap fastener 11 for holding a wireless pen (see 24 in FIG. 5).

Figure 1A:
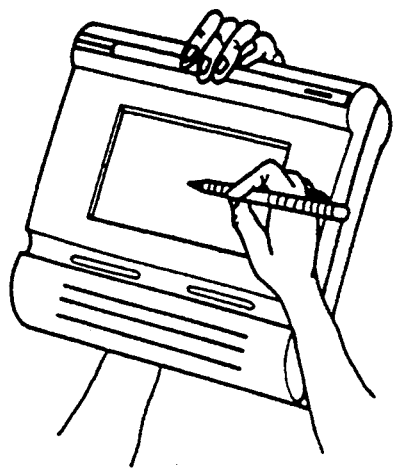
FIG. 1 illustrates five ways to hold a pen-based form computer according to the present invention.
Figure 1B:
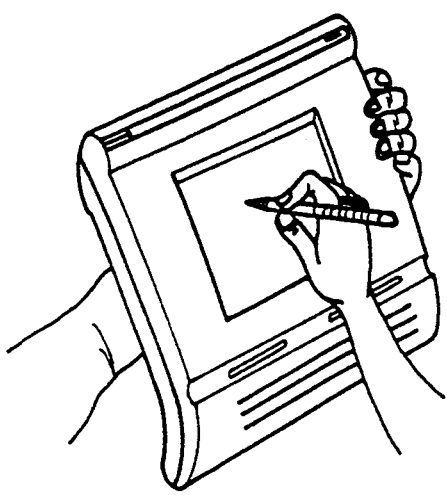
Figure 1C:
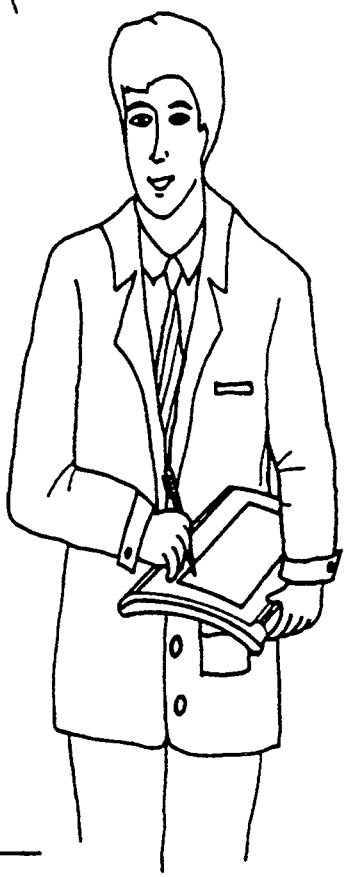
Figure 1D:
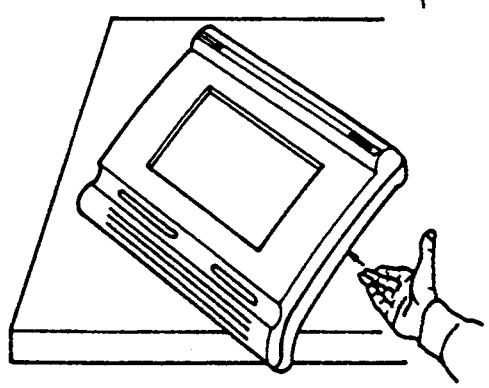
Figure 1E:
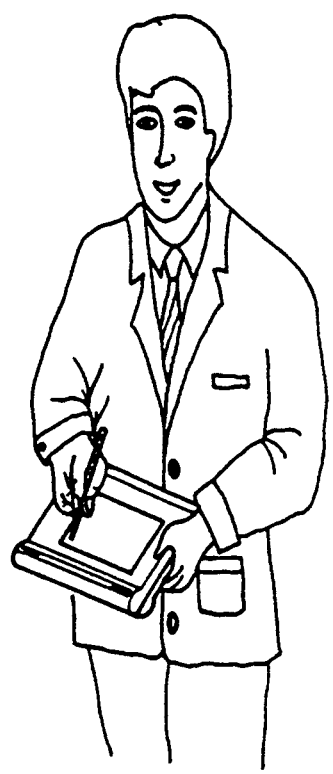
Figure 3:
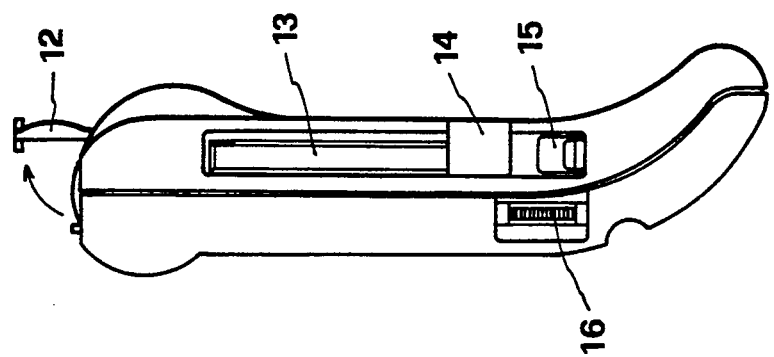
FIG. 3 is a right side view of the pen-based form computer showing the position of the IC memory card slot.
Figure 4:
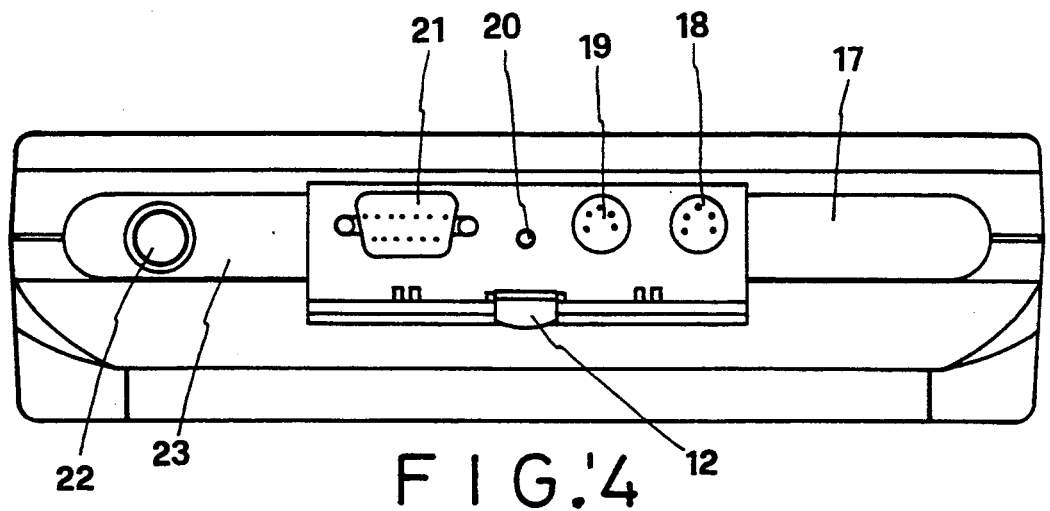
FIG. 4 is a front view of the pen-based form computer.

Referring to FIG. 3, therein illustrated is an IC memory card slot 13 on the right side of the pen based form computer for inserting an IC memory card, and an interface lid 12 at the top covered over the connector shown in FIG. 4. After an IC memory card has been inserted in the IC memory card slot 13, the slide which is indicated at 15 is slided up to lock the card in place. Removing the IC memory card from the IC memory card slot 13 is easy and made by: sliding down the slide 15 and then pushing the eject, which is indicated at 14, to drive out the IC memory card automatically. The IC card adopts a PCMCIA standard hardware interface. The numeral 16 designates a LCD brightness control for controlling the brightness of the LCD 9.

Referring to FIG. 4, therein illustrated is the front view of the pen-based form computer, in which 22 designates a power switch; 21 designates a RS-232 connector for connecting a RS-232 cable or modem (normal line modem or RF modem); 18 designates a power connector for charging internal rechargeable batteries; 19 designates a keyboard connector for using an external keyboard as an alternative input device; 20 designates a reset button for clearing error settings under abnormal conditions and resetting the system to initial conditions; 17 and 23 designate an infrared transmitter and an infrared receiver (HC737-241 and EL-1 from KODENSHI CORP.) for short distance wireless data communication.

Figure 5:
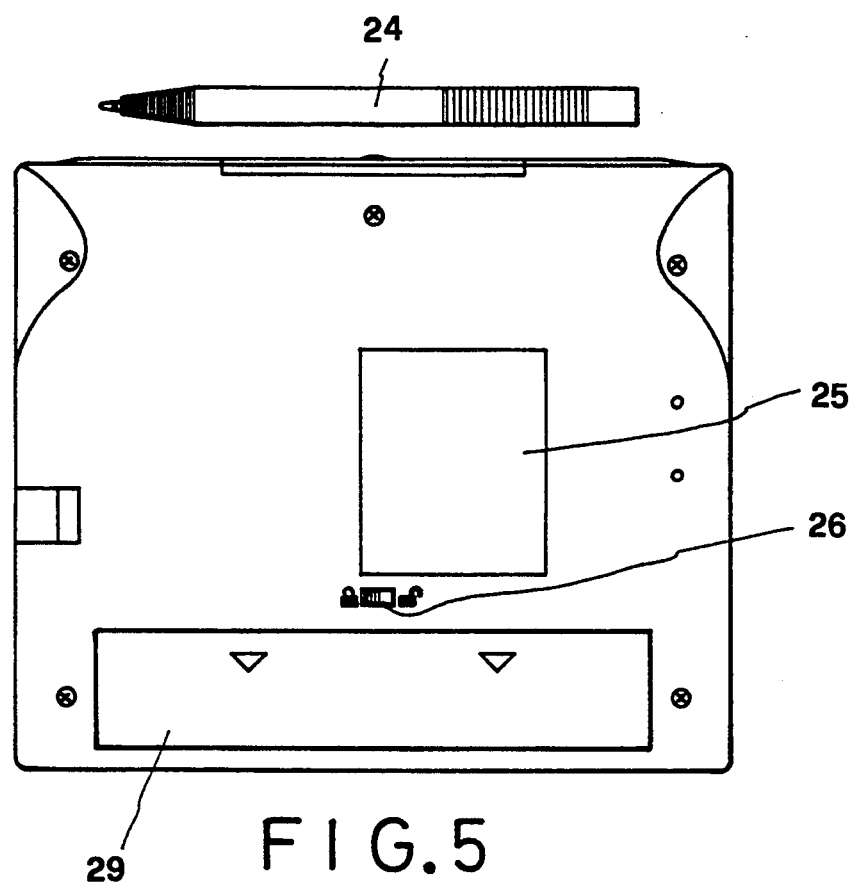
FIG. 5 is a back view of the pen-based form computer.
Figure 6:
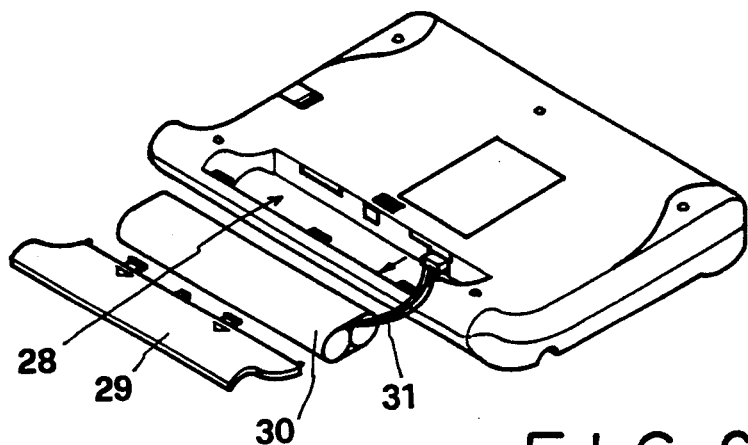
FIG. 6 is a perspective view of the battery compartment of the pen-based form computer.

Referring to FIGS. 5 and 6, the whole system of the pen-based form computer is a ROM (read only memory) based system, i.e. , the system software is installed in ROMs. In the present preferred embodiment, 27C010 (128×8) ROMs are used. These ROMs are installed in a ROM mount as indicated at 25. KR-1300AE Ni-Cd rechargeable batteries (from Sanyo) are inserted in a battery compartment 27 and locked by a lock 26 to provide the system with power supply. In FIG. 6, the numeral 28 indicates the inside of the battery compartment; 29 indicates the battery lid; 30 indicates the batteries; 31 indicates the electric wiring. In FIG. 5, the numeral 24 indicates a pen used with the pen-based form computer. The pen 24 does not comprise any electronic components. Any object can be used to cause reaction of the touch panel (as indicated at 8 in FIG. 2) by giving it a pressure. The touch panel accepts or rejects touch signals according to the intensity of pressure.

Figure 7:
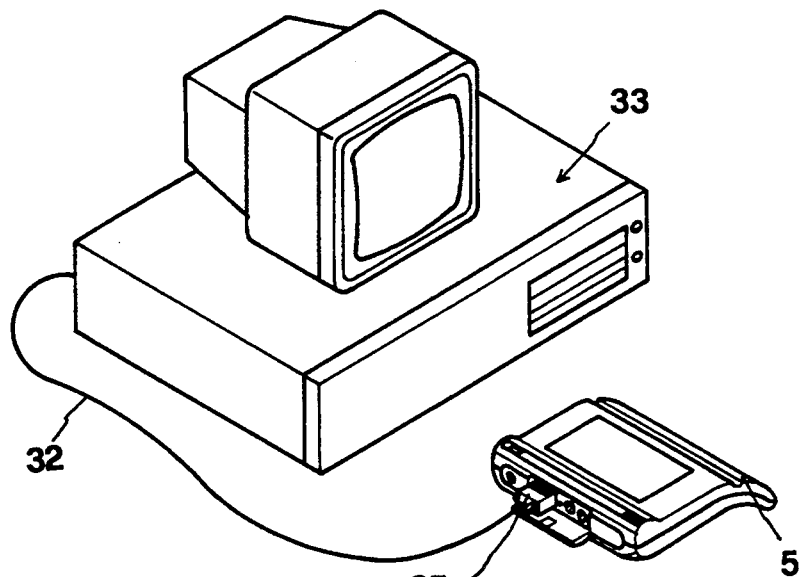
FIG. 7 illustrates the pen-based form computer connected to a desktop computer by a RS-232 cable.

Referring to FIG. 7, a pen-based form computer in accordance with the present invention, as indicated at 5, may be connected to a desktop computer 33 by a RS-232 cable 32 with a RS-232 connector 35. Modem drivers of X and Y Modem protocols are built-in the system software.

Figure 8:
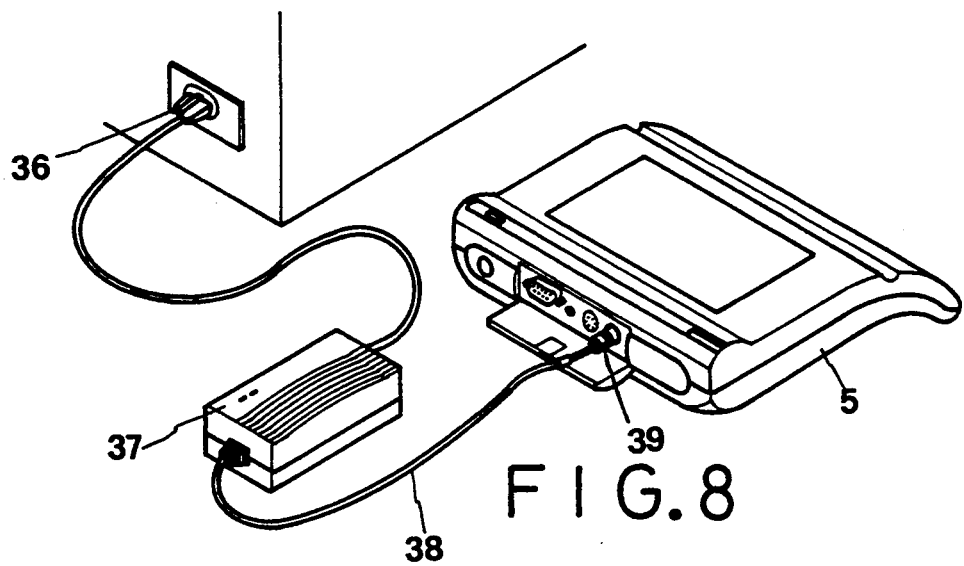
FIG. 8 illustrates the pen-based form computer connected to an AC power supply outlet through an AC/DC adapter to charge its rechargeable batteries.

FIG. 8 illustrates the pen-based form computer 5 connected to an AC power supply outlet to charge its rechargeable batteries, in which 39 indicates a power connector; 38 indicates a power cord; 37 indicates an AC/DC adapter; 36 indicates an AC power supply outlet. The AC/DC adapter 37 is a regular AC/DC adapter which is commonly used in charging Notebook personal computers.

Figure 9:
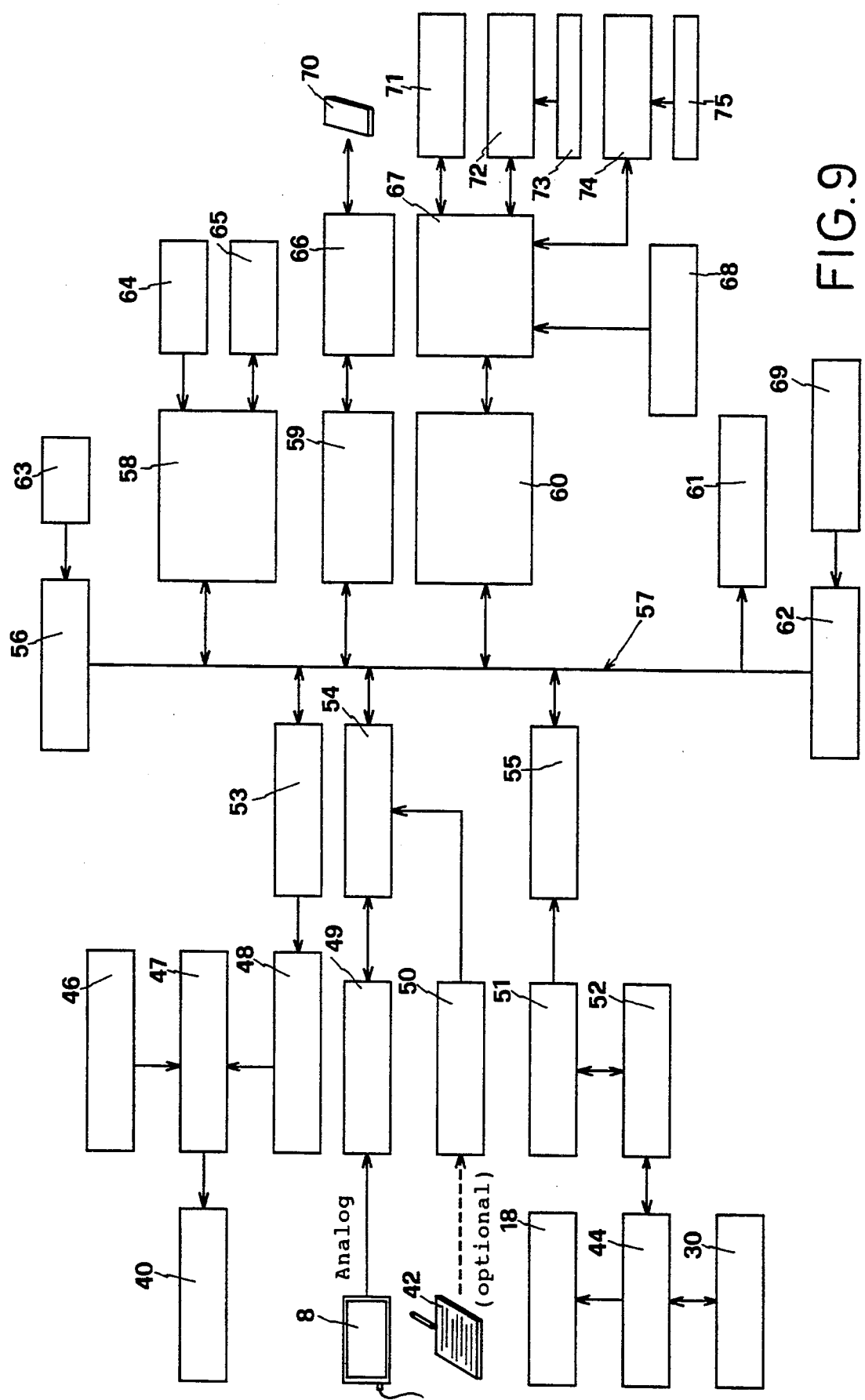
FIG. 9 is the system hardware block diagram of the pen-based form computer.

Referring to FIG. 9, therein illustrated is the system hardware block diagram of the pen-based form computer. The central processing unit (TMP68301 from Toshiba), as indicated at 56, is a microprocessor unit based on a 68000CPU, which executes the main jobs of the system. Clock pulse is provided to the CPU 56 by a Clock 63. The Clock 63 also supports all other blocks except the Bus Control Unit, which is indicated at 62. Controllers 53, 54, 55, 58, 59, 61, 61, are intercommunicated through an asynchronous system bus 57. The numeral 53 indicates a Display DMA Controller which accesses display image from a read/write sector 65 and then stores it in a display memory 48. The numeral 47 indicates a display controller (MSM6255 from OKI) which reads the image of the display memory 48 according to the clock of a display clock 46 and then sends it to a display 40. The numeral 54 indicates an input device controller which transfers error-free point locations from a touch panel controller 49 (DMC8910-12 from Dialogue) to the CPU 56 by means of interrupt control (see FIGS. 22 and 23).

Upon receipt of analog inputs from the touch panel, which is indicated at 8, the touch panel controller 49 immediately converts the analog inputs into corresponding stable, digitized dot coordinate. The touch panel controller 49 can also correct touch panel position according to the instruction from the input device controller 54 (when there is a deviation between the display of the LCD and the point touched on the touch panel 8).

Figure 10:
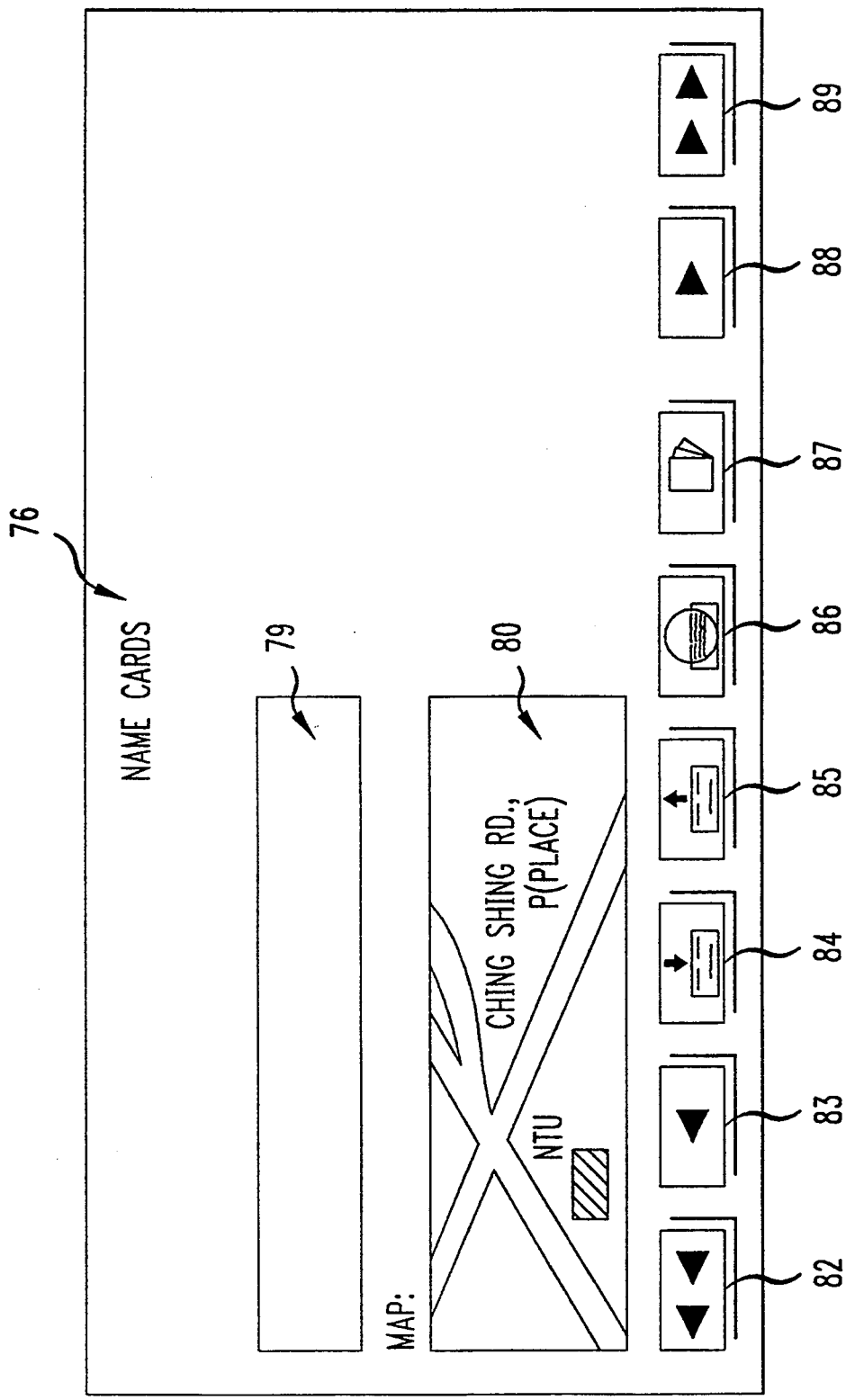
FIG. 10 shows the example of a form named "Name Cards"

The numeral 50 indicates a keyboard controller which is a normal keyboard controller (Intel 8048) designed to connect an external keyboard 42 for permitting its key-in characters to enter the present system. The numeral 55 indicates a power controller (Intel 8051) which uses a level sensor 51 (a normal RC circuit assembly) to detect the percentage of remaining power supply and to operate with a charging controller 52 in continuing charge charging or stopping from charging. The numeral 44 indicates a DC/DC adapter which provides a stable 7.2 V DC power supply from a rechargeable power connector 18 (connected to an external AC/DC adapter 37) to a battery 30. The numeral 58 indicates a memory control unit which reads the execution code from a read only sector 64 (ROM based OS is in this sector) and then sends it to the CPU 56 for execution, or access the read/write sector 85 to store or retrieve system data of Heap, Stack, I/0 buffers (normal O.S. structure) and user data (like a disk format stored therein). The numeral 59 indicates an IC card DMA controller which connects to a PCMCIA IC card interface 66, which is formed of a SRAM (6116) and a TTL Logics,for connecting an external IC card 70 to use as a secondary memory. The numeral 60 is a serial ports controller which connects to a standard RS232C interface (MAX 241CW1 from MAXIM) 67 for intercommunication with a modem interface 71 compensation circuit (a normal signal level, timing compensation circuit), an infrared interface 72, the clock of which is obtained from an IR clock 73, a RF/IF 74, the clock of which is obtained from a RF clock 75. The numeral 68 is a microphone which sends out voice from the modem interface 71 or the RF interface 74. The numeral 61 is a speaker interface controlled by the CPU 56 to produce sound. The aforesaid bus control unit 62 is a normal state machine formed of a TTL logic and a static RAM (6116) and control to arbitrate the bus. The TTL logic circuit of the bus control unit 62 may be integrated by ASIC (application specific integrated circuit) to reduce its space without changing its function. The numeral 69 indicates a bus clock which provides the necessary clock to the bus control unit 62. "Form" is an aggregate of data collected according to a specific purpose. FIG. 10 shows a form 81 named "Name Cards" 76 which interprets the contents and purposes of a form according to the present invention. A form 81 according to the present invention is comprised of various "Ports" of different functions. In this exemplar, the ports of "Name:", "Birthdate:", "Address:", "Map:", "Age:", "Sex:", "Tel:", and "Fax:" in the form of "Name Cards" 76 are display-only character string ports which do not accept data entry. The ports indicated at 77, 78, 79 and 80 are ports which accept data entry. The port indicated at 77 is a string port which accepts character string; the port indicated at 78 is a date port which accepts date format; the port indicated at 79 is a list port which accepts multiple lines character string; the port indicated at 80 is a bitmap port which accepts graphic inputs (or freehand inputs). These data which are stored through different storage methods are the components of the form 81 of "Name Cards" 76. The numerals 82, 83, 84, 85, 86, 87, 88, 89 indicate eight Button Ports. The operation of the Button Ports is similar to a button. For example, pressing the Button Port 82 causes display of the first "Name Card". This operation is executed according to the definition of the respective port ( see FIG. 19 ).

The application of the pen 24 in the present system is to provide the functions of control and data entry. In FIG. 11, the numerals 90, 91, 92, 93, 94, 95, 96, 97, 98, 99, 100 indicate different gestures for different function controls. When a gesture is recognized, the system immediately executes an action according to the instruction of such a gesture.

Figure 12:
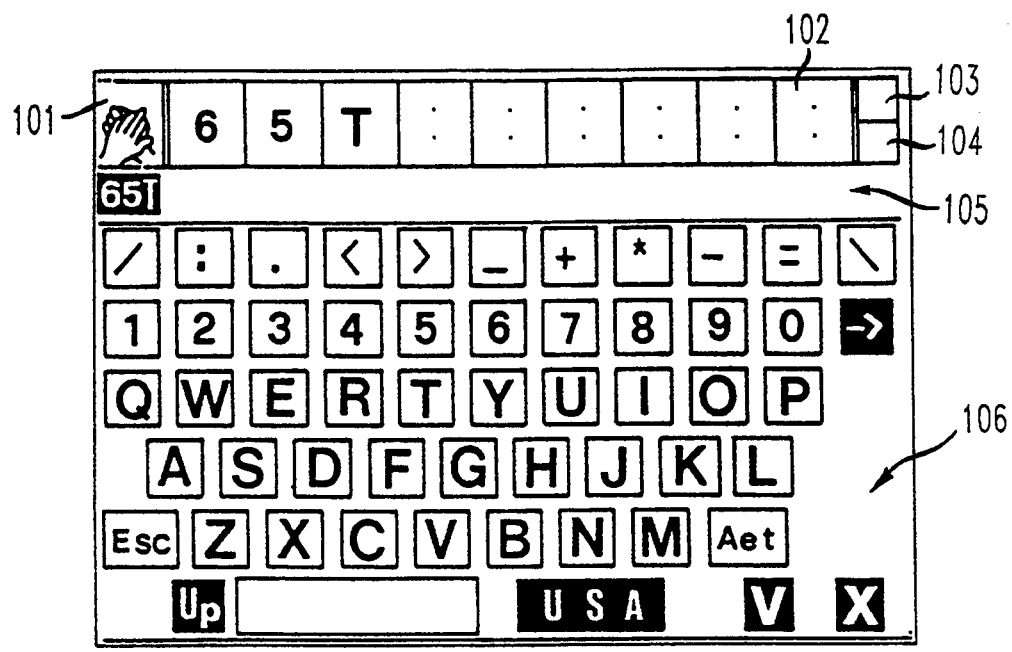
FIG. 12 shows the screen keyboard layout.
Figure 13:
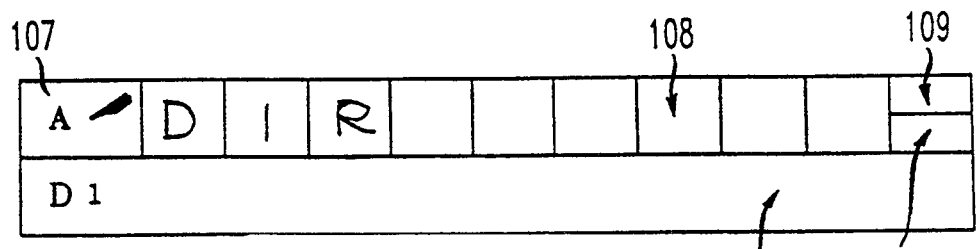
FIG. 13 shows the writing pad layout.

FIG. 12 shows a keyboard layout displayed through the touch panel 8 in FIG. 2 for inputting. Under this stage, user can use the gesture 95 (FIG. 11) to input data by pressing keys in area 106 like normal keyboard key-in operation. In FIG. 12, the numeral 101 indicates an icon display block. When icon appeared at 101, it means that the system does not start handwriting recognition (OLCR, see FIG. 27). When pattern 107 appeared in the display block 101 (see FIG. 13), it means OLCR already started. After OLCR started, the second and third candidates of the recognition are shown at 103, 104, 109, 110 while the first has been put on 102 or 108 already. Use the gesture 99 or 100 of FIG. 11 in 108 or 102, scrolling effect is produced. The other gestures will produce respective effects according to their respective definitions when they are used.

Figure 14:
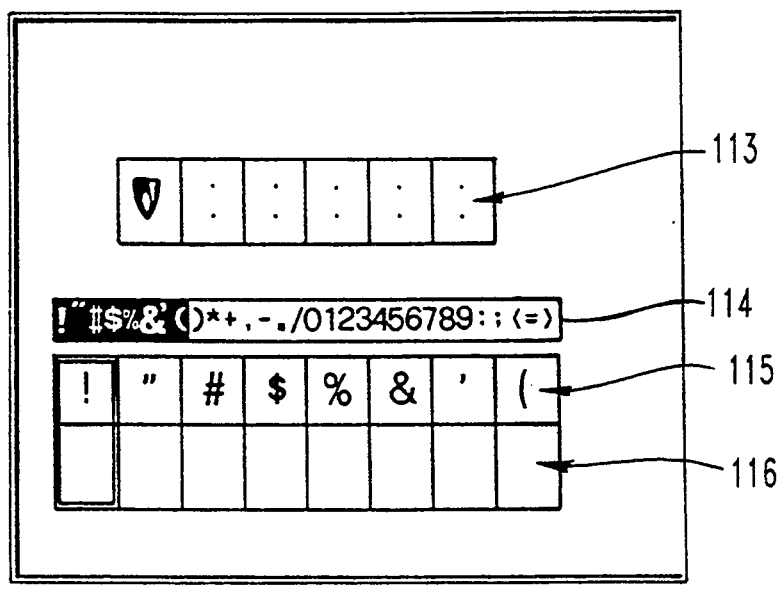
FIG. 14 shows the learning pad layout.

Referring to FIG. 14, therein illustrates is the training of the system to know an individual's specific handwriting style. The numeral 114 indicates all letters, numbers, and symbols. The numeral 115 indicates the eight characters the system is going to learn. The numeral 112 indicates five blanks 113. The system start learning when a character, for example: "1 " is written in the blanks 113 by hand. When OLCR is started in the days to come, the system will recognize characters according to its previous learning.

Figure 15:
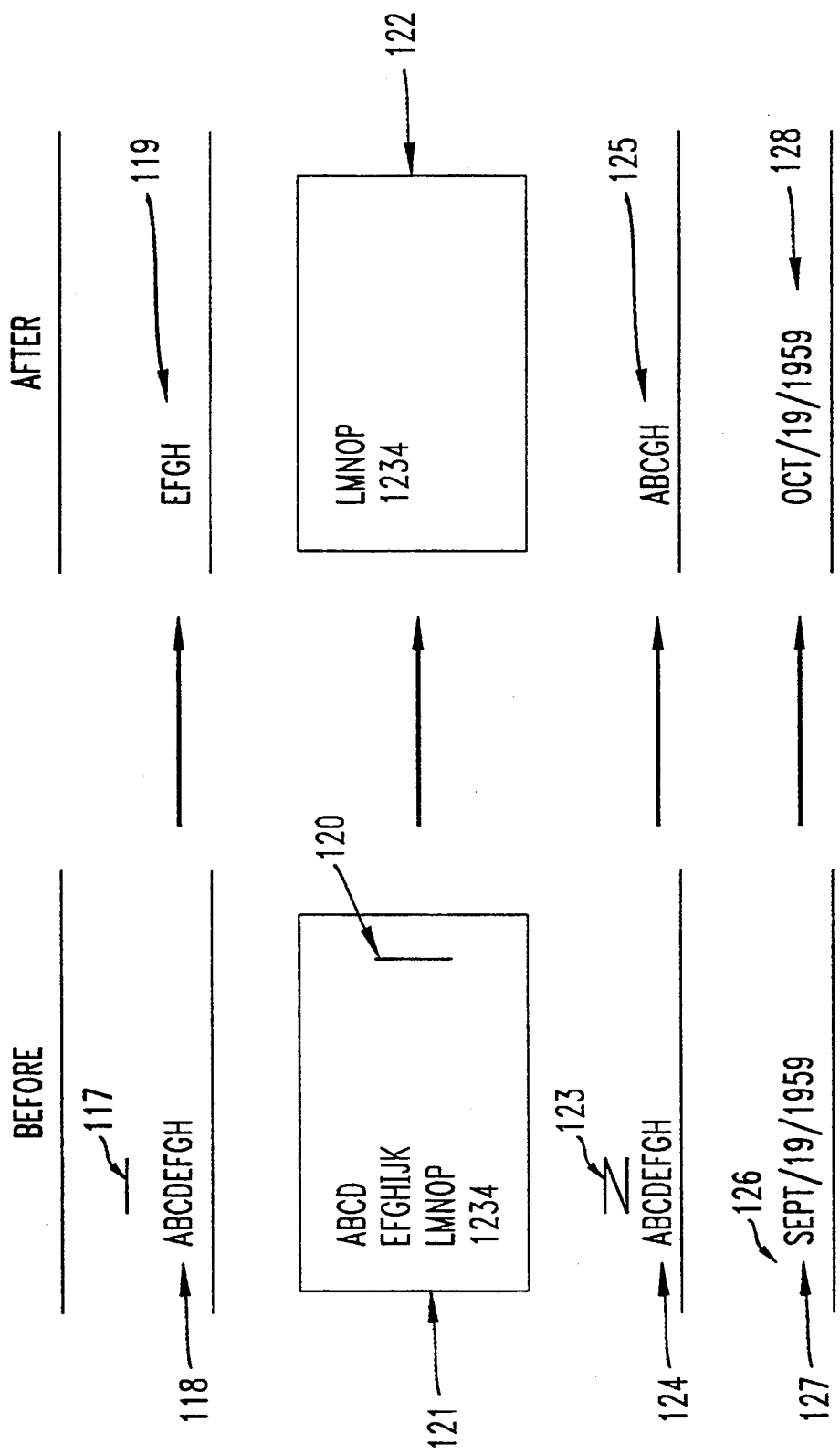
FIG. 15 shows the controls of data ports by gestures.

The foregoing statement explains enter data and how to let the system lean characters. In a port (see FIG. 10), gestures are fully utilized. FIG. 15 shows some gesture examples: 117 indicates scroll left; 120 indicates scroll up; 123 indicates erase; 126 indicates the action of "next mouth" based on the Data port.

Figure 17:
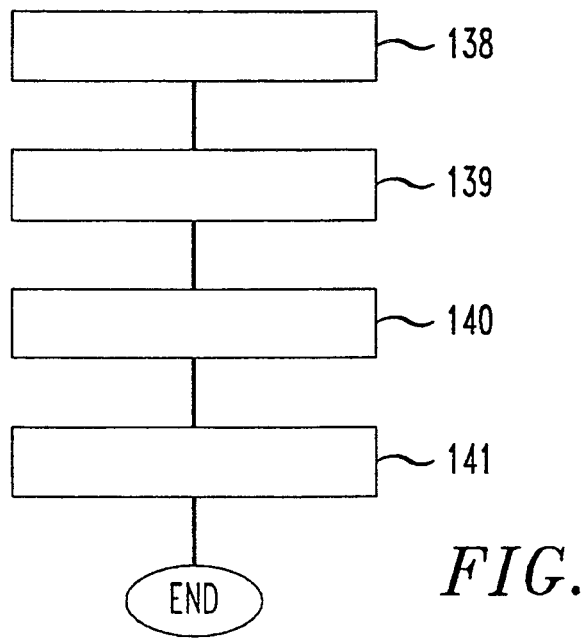
FIG. 17 is a form making flow chart according to the present invention.
Figure 18:
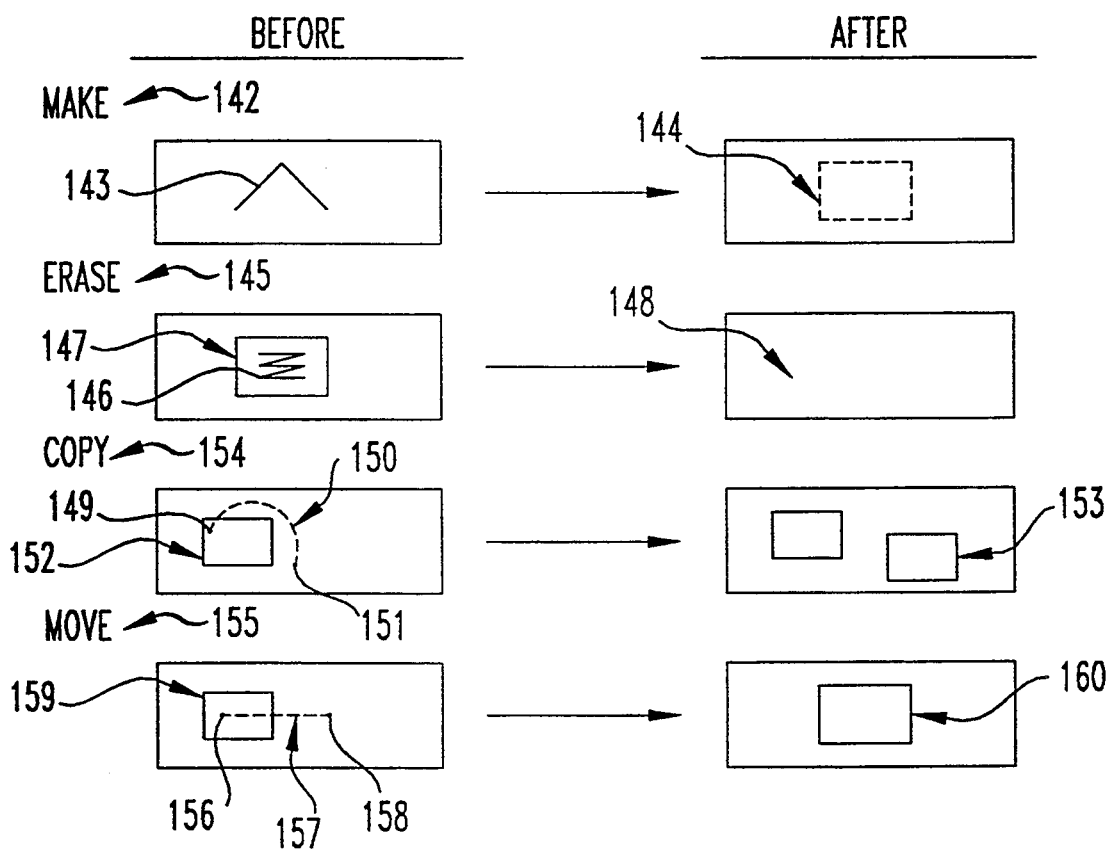
FIG. 18 is a port geometry making flow chart according to the present invention.

Form making process and its internal structure will now be outlined hereinafter. FIG. 17 shows a form making flow chart according to the present invention. When entered port definition 138, it immediately starts to make port geometry 139. FIG. 18 shows the geometry making procedure. Use the pen 24 (FIG. 5) to make a gesture 143 (as shown FIG. 18) on the touch control panel 8 (see FIG. 2), so as to draw the size of the port. This action is called "Make" port 142. Drawing the gesture 146 in an existing port 147 causes clearance of the port, and the result is as shown at 148. This action is called "Erase" 145. If to drag 150 the upper left corner 149 of an existing port 152 to a new location 151 by means of the gesture 95 (FIG. 11), a port 153 will be duplicated at the new location 151. This action is called "Copy" 154. If to drag 157 the middle 156 of an existing port 159 to a new location 158 by means of the gesture 95 (FIG. 11), the port will be shifted to the new location, as indicated at 160. This action is called "Move" 155. "Make port geometry" 139 is fulfilled according to the aforesaid procedures. After "Make port geometry" 139, it proceeds to "Set port attributes" 140, which is detailed in FIG. 19. The input methods in FIGS. 12 and 13 and the gestures in FIG. 11 are used to "fill in" the port attributes-related "Form". Port name is to be filled in the blank indicated at 161. The numeral 162 indicates an option chart for choosing the type of the port. Type classification is internally stored and externally displayed for reference. The numerals 163, 164, 165, 166 are for port settings. The numeral 163 allows the port to make data entry; 164 allows the port to receive gesture controls; 165 and 166 allow the port to scroll; 167, 168, 169, 170, 171 are for selecting the type of port display; 172 and 173 are to define the operation of the form by means of a scripting language (FIG. 20). The content of 172 will be executed once each time an operation appears in the Form. The content of 173 will be executed once only when a gesture appears in this port. The numeral 174 is to give an initial value. The numerals 175, 176, 177 are also for display controls. "Set port attributes" 140 is fulfilled according to the aforesaid procedures. After setting of port attributes, the system immediately executes the operation of "Automatically link ports to Database fields 141.

Figure 16:
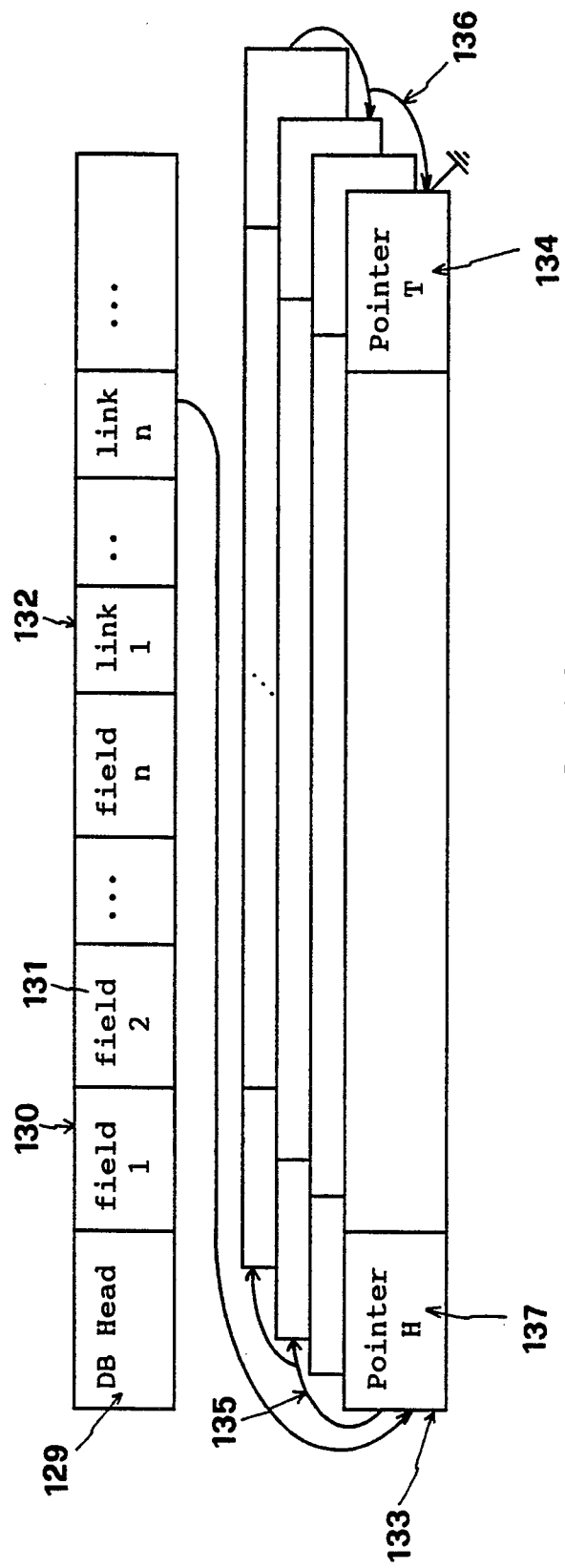
FIG. 16 illustrates a mixed Database file form.
Figure 19:
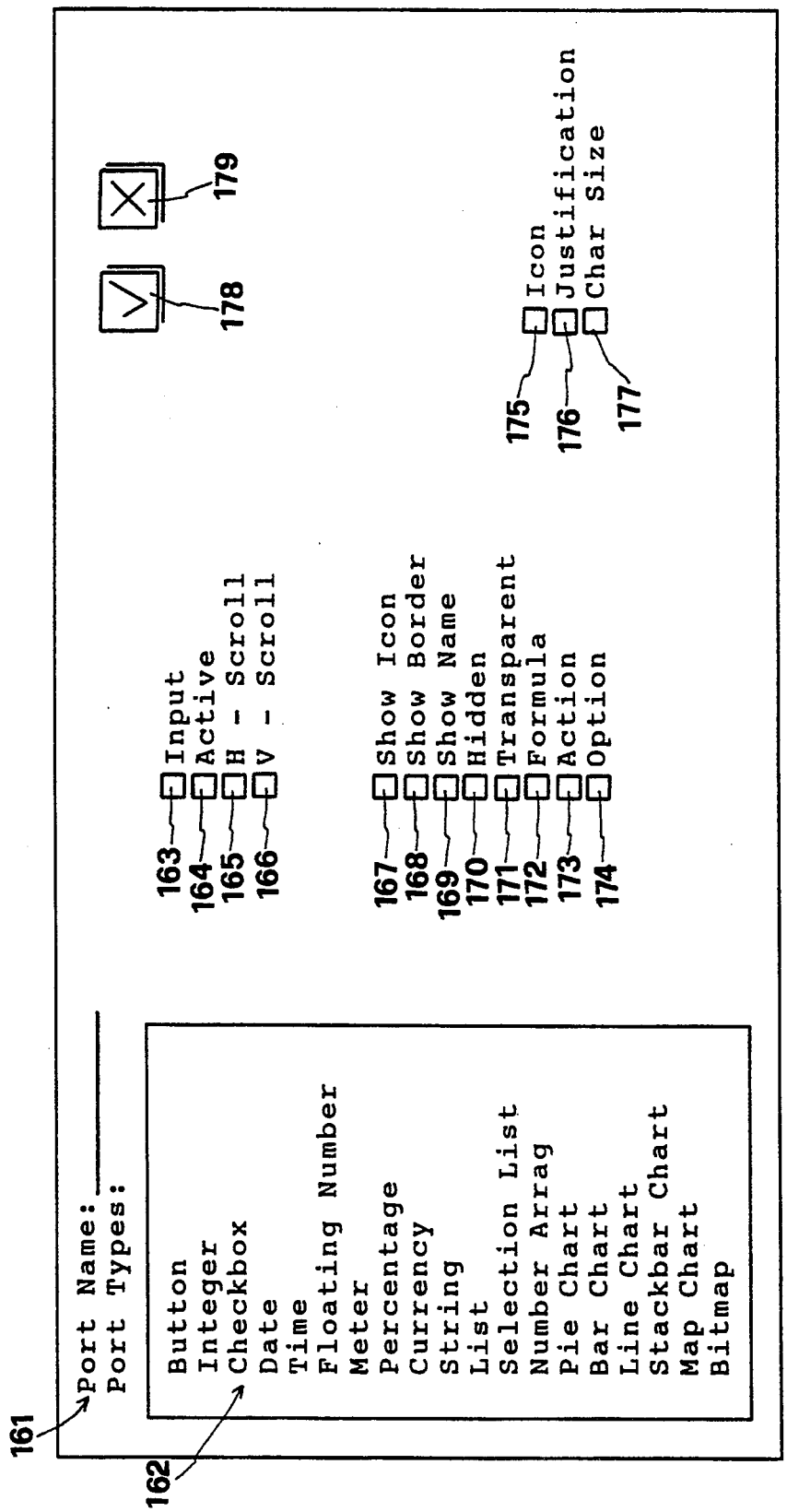
FIG. 19 illustrates the procedure to define port attributes according to the present invention.

As indicated in FIG. 19, there are a variety of ports in the form which are kept in the same Database through Fixed Format and Free Format (see FIG. 16). In FIG. 16, Fixed Format is indicated at 129 which includes a "DB Head" as indicated at 130, which is the overall descriptions of the Database. The fields at 131 are of Fixed Format data fields; the links at 132 are pointers to indicate the first Block 133 subject to this Free Format field. The "Pointer H" at 137 indicates the next block of this Free format field. These Forward pointers 135 are to indicate the data subject to this Free format field in proper order. Backward pointers as indicated at 136 are to match with the Forward pointers 135 for block maintenance. In FIG. 17, the step 141 is to automatically link ports to database fields, or to automatically produce new fields.

Figure 21:
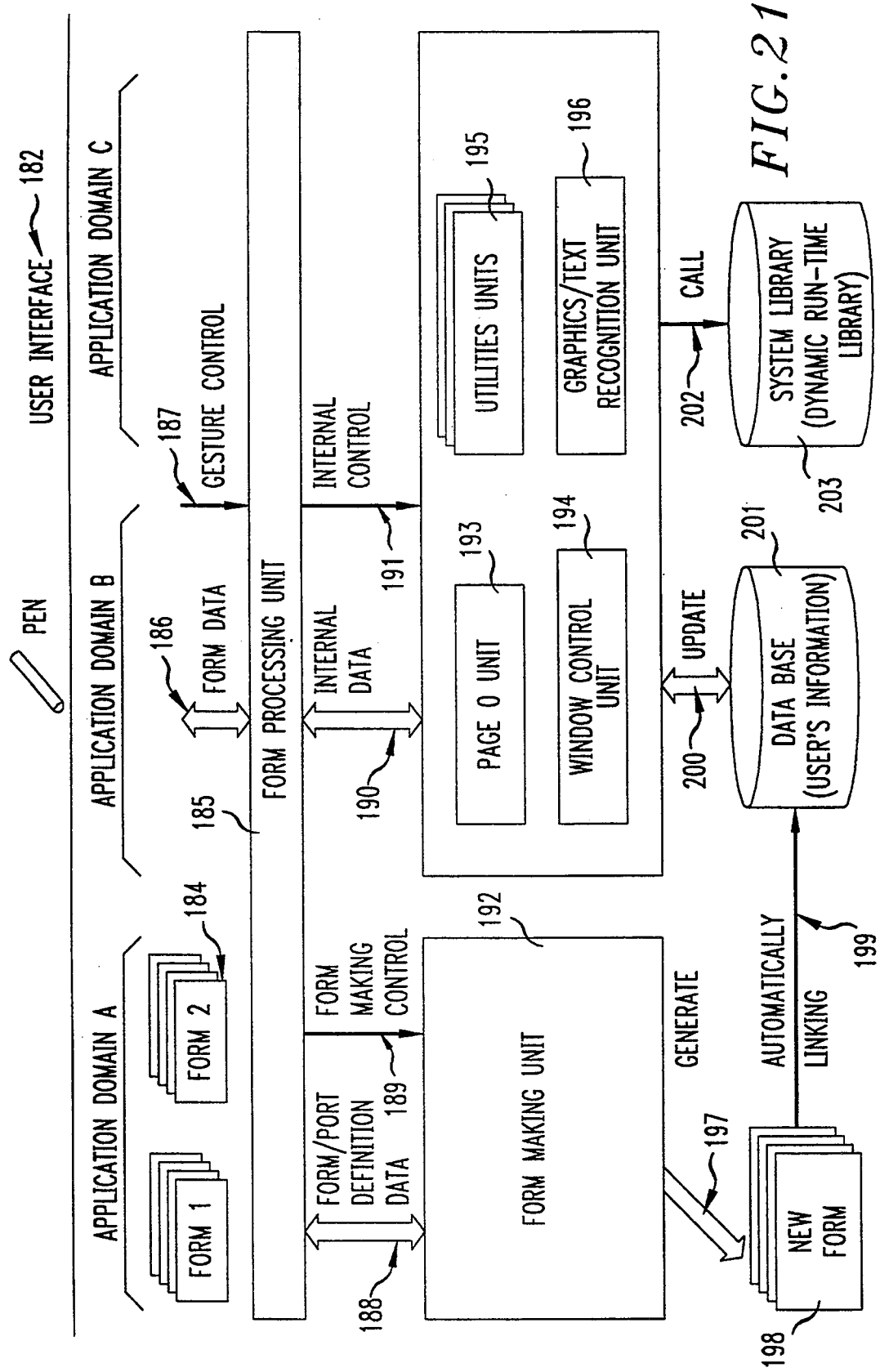
FIG. 21 is an overview of a Multi-Tasking Form Processing according to the present invention.

The foregoing statement explains how to make Form and link Form with database. The internal structure of the system which achieves the use of Form as the operation metaphor, is outlined hereinafter. FIG. 21 explains the software structure of the system by means of function classification. User 181 uses the present pen-based form computer. User interface 182 sees different Applications 183. Each application A, B, C comprises a number of Deck of Forms. This is the Form metaphor structure. The Form Processing Unit as indicated at 185 receives Gesture Control 187 and interpret Form data 186 for the system itself as well as the user 181. If a Form is used, the Form Processing Unit 185 drives an Internal Control 191 (see FIG. 22) to control a Page 0 Unit 193, a Window Control Unit 194, a Utilities Unit 195, and a Graphics/Text Recognition Unit 196. Therefore the core of the system can use the Internal Data 190 to talk with the Form Processing Unit 185. This core uses the Dynamic Run-time Library 203 of the system by call 202. When user information is to be processed, the Database 201 is updated through Update 200. In this core, all operation objects are made by Form, i.e., the key points are to provide Form with the needed data, and to control its operation. The Form Processing Unit 185 is the vital point of the whole system operation. FIGS. 23A, 23B, 123C, 23D, 23E, 23F, 23G explain the main flow of the Form Processing Unit 185.

Figure 22:
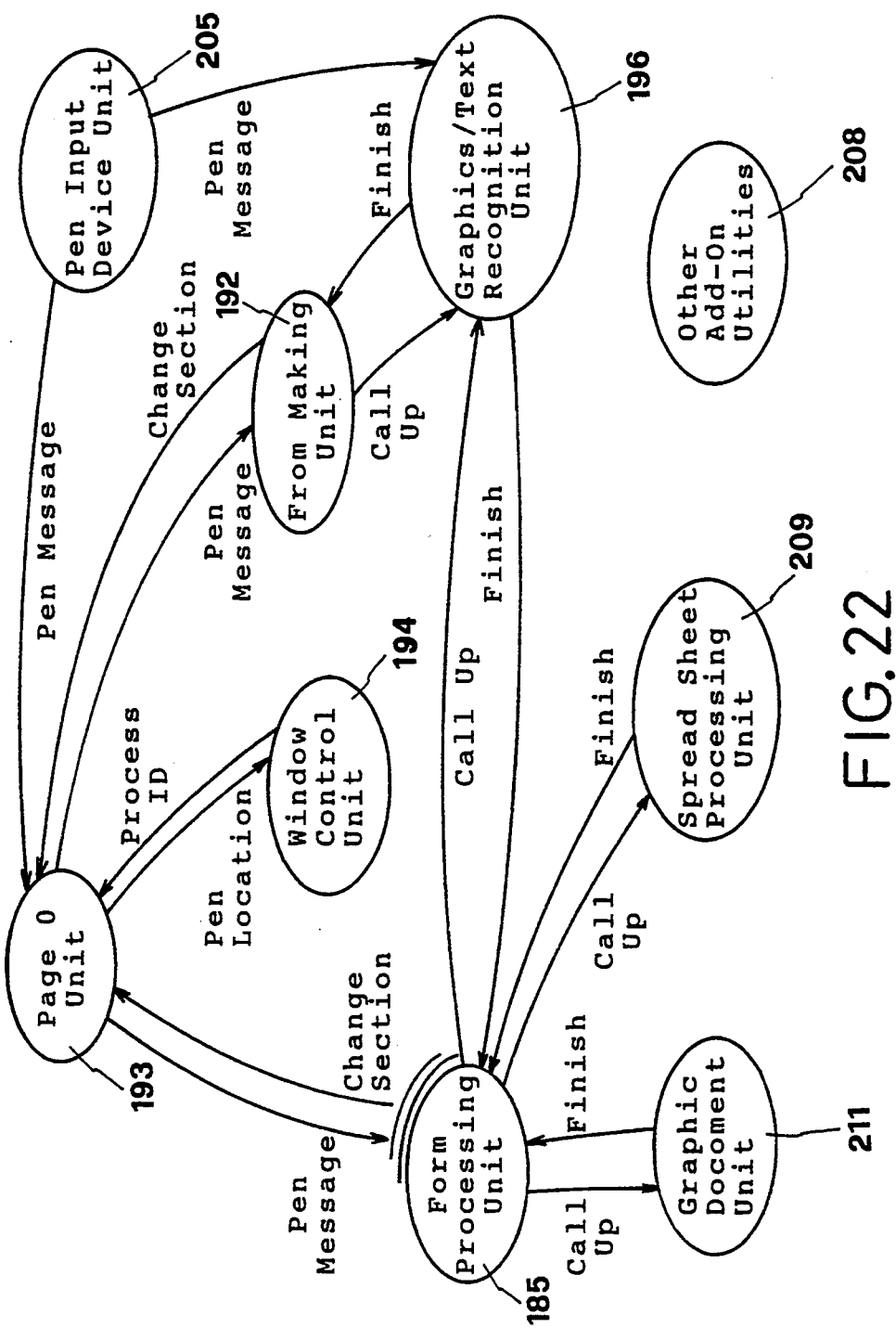
FIG. 22 is a process diagram of the Multi-Tasking Form Processing.
Figure 23A:
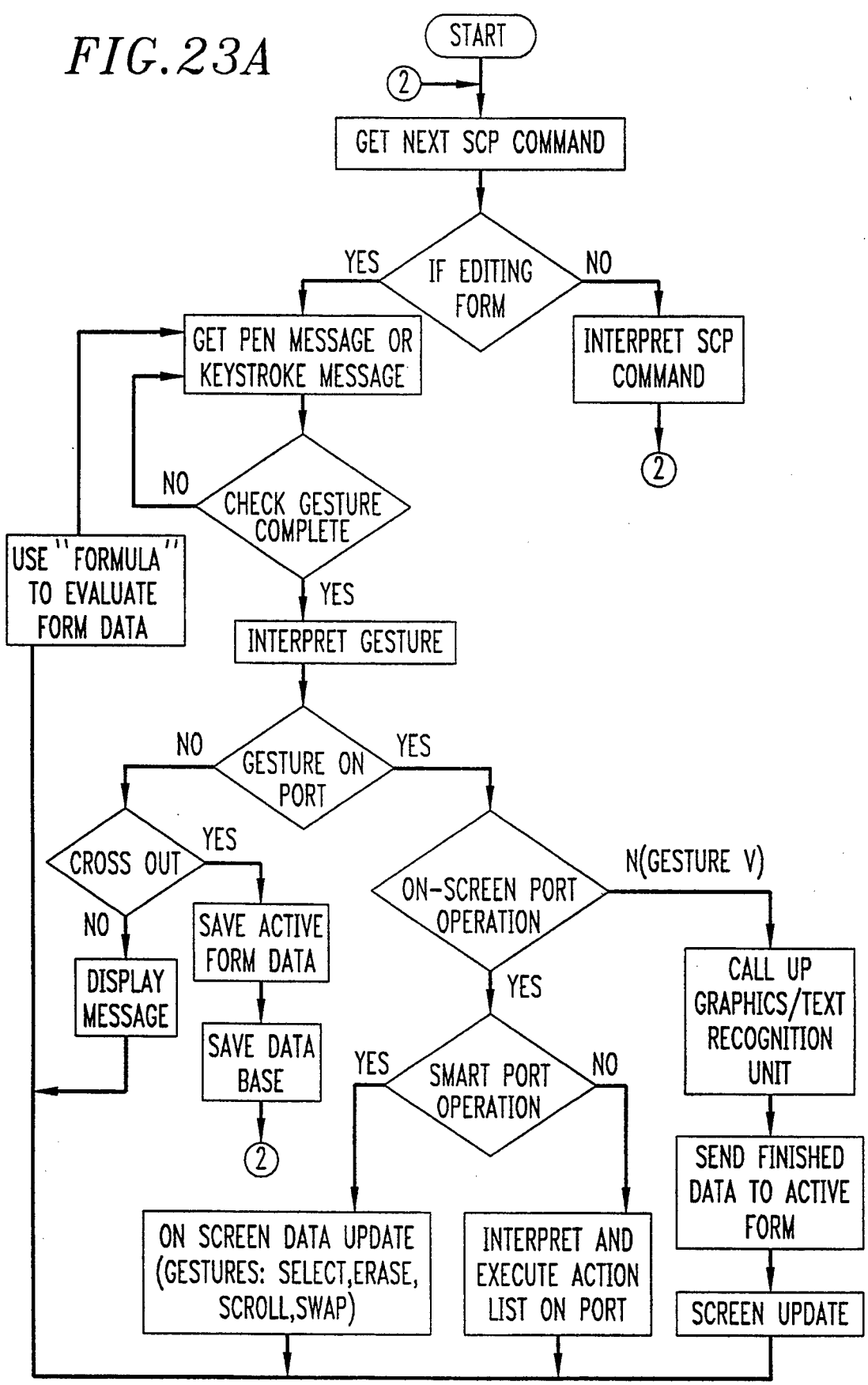
FIG. 23A through 23G are flow charts of a Form Processing Unit according to the present invention.
Figure 23B:
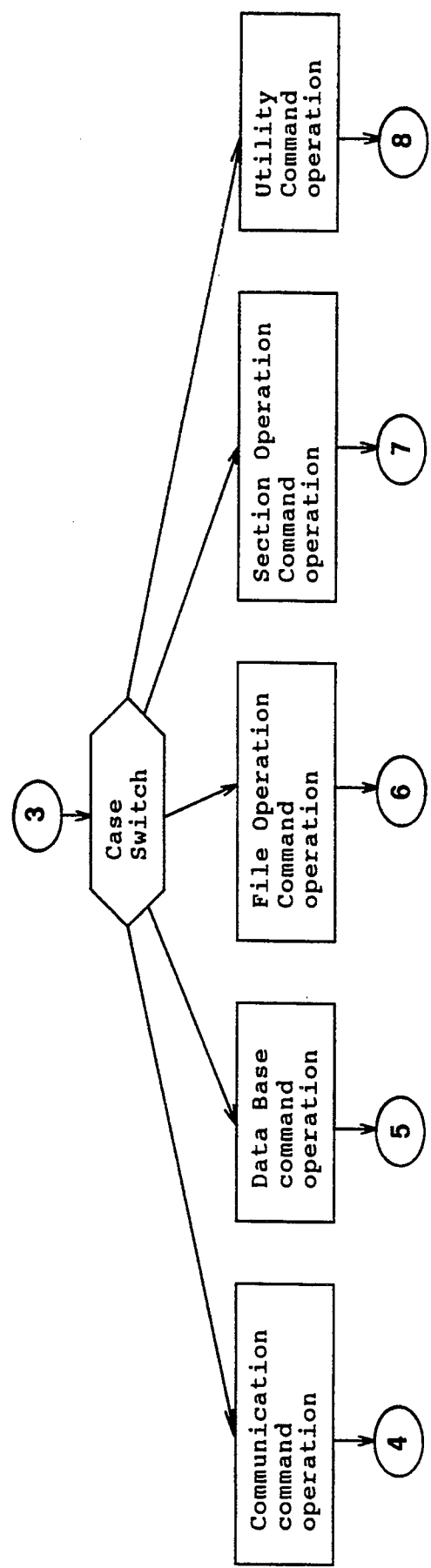
Figure 23C:
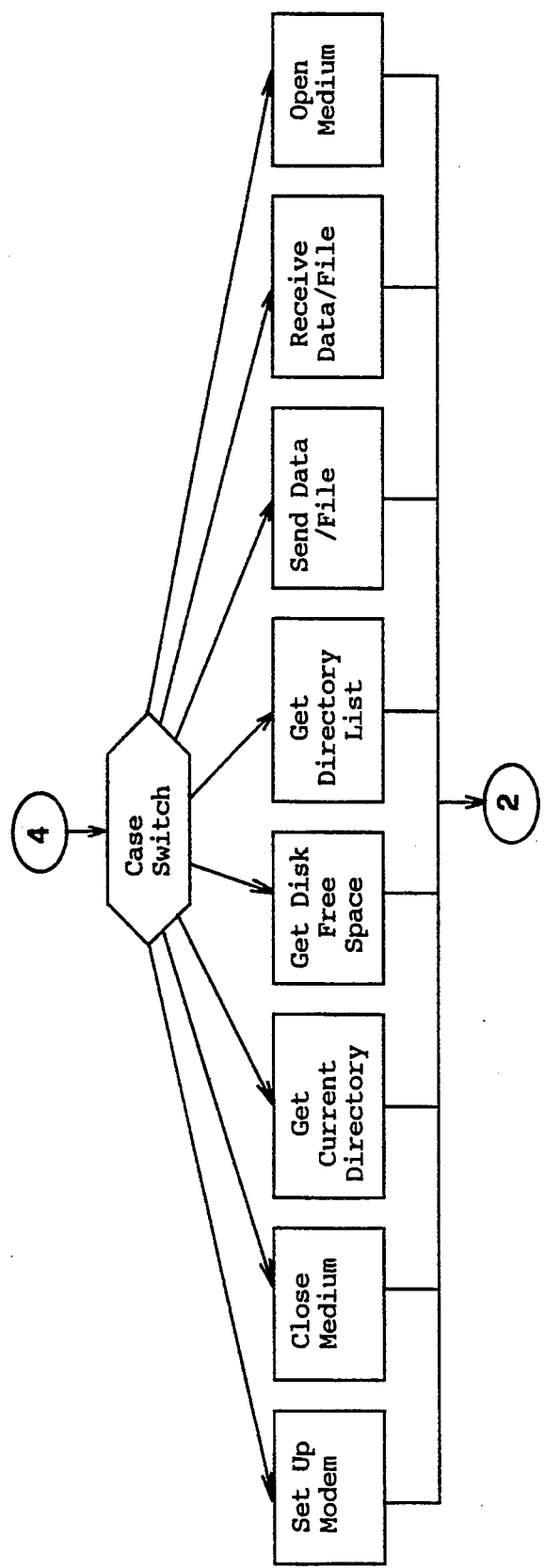
Figure 23D:
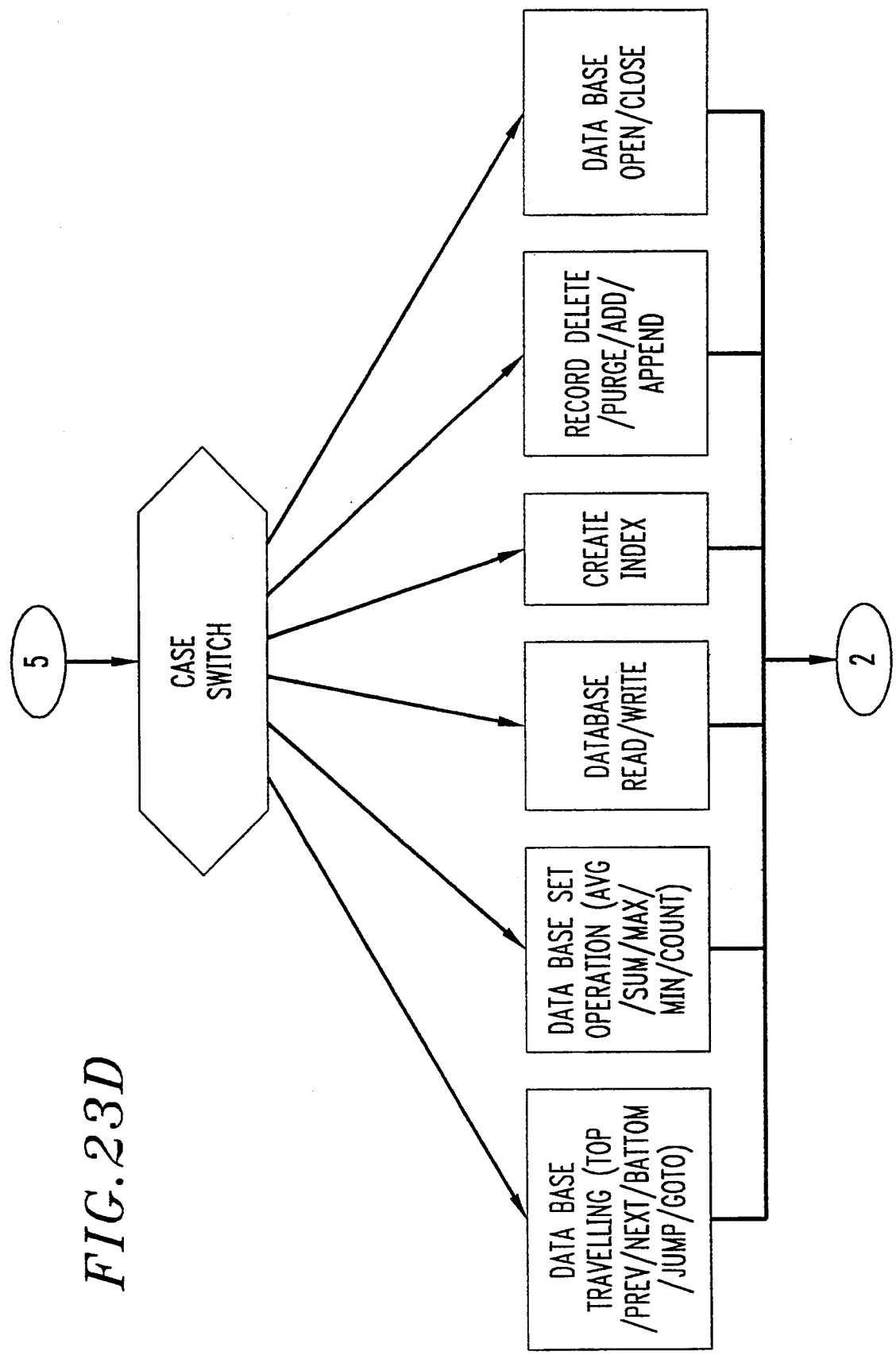
Figure 23E:
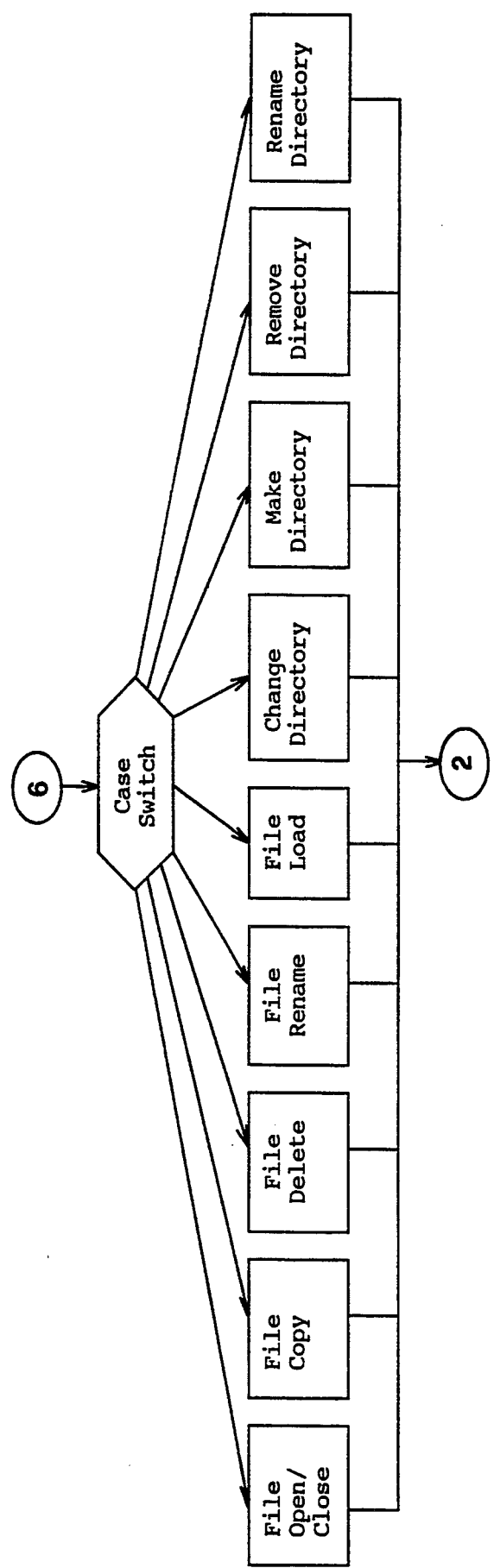
Figure 23F:
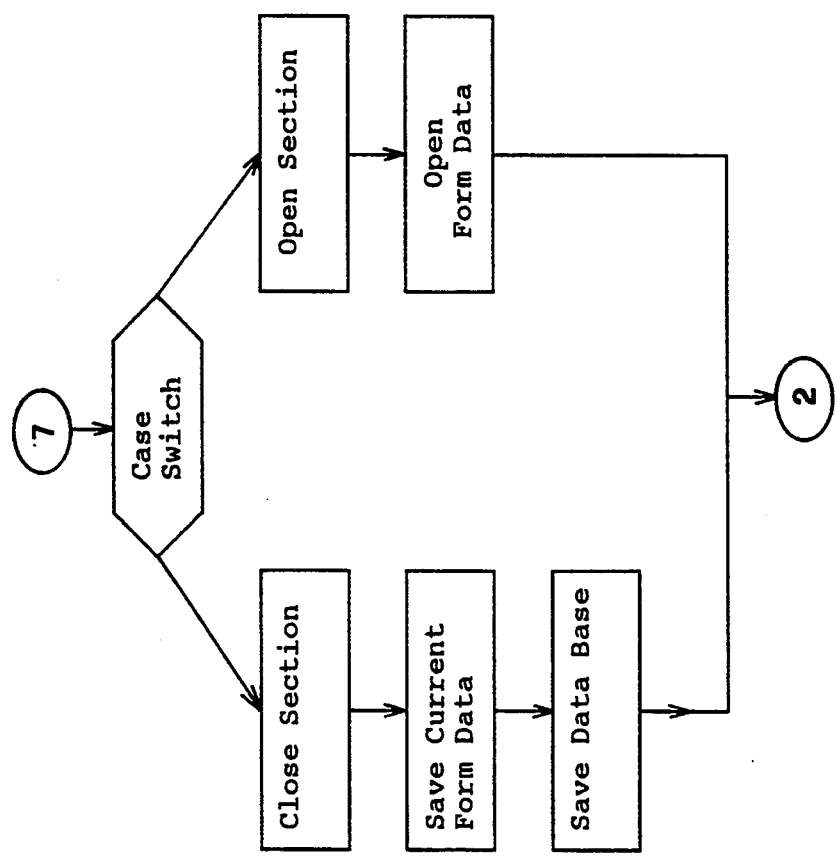
Figure 23G:
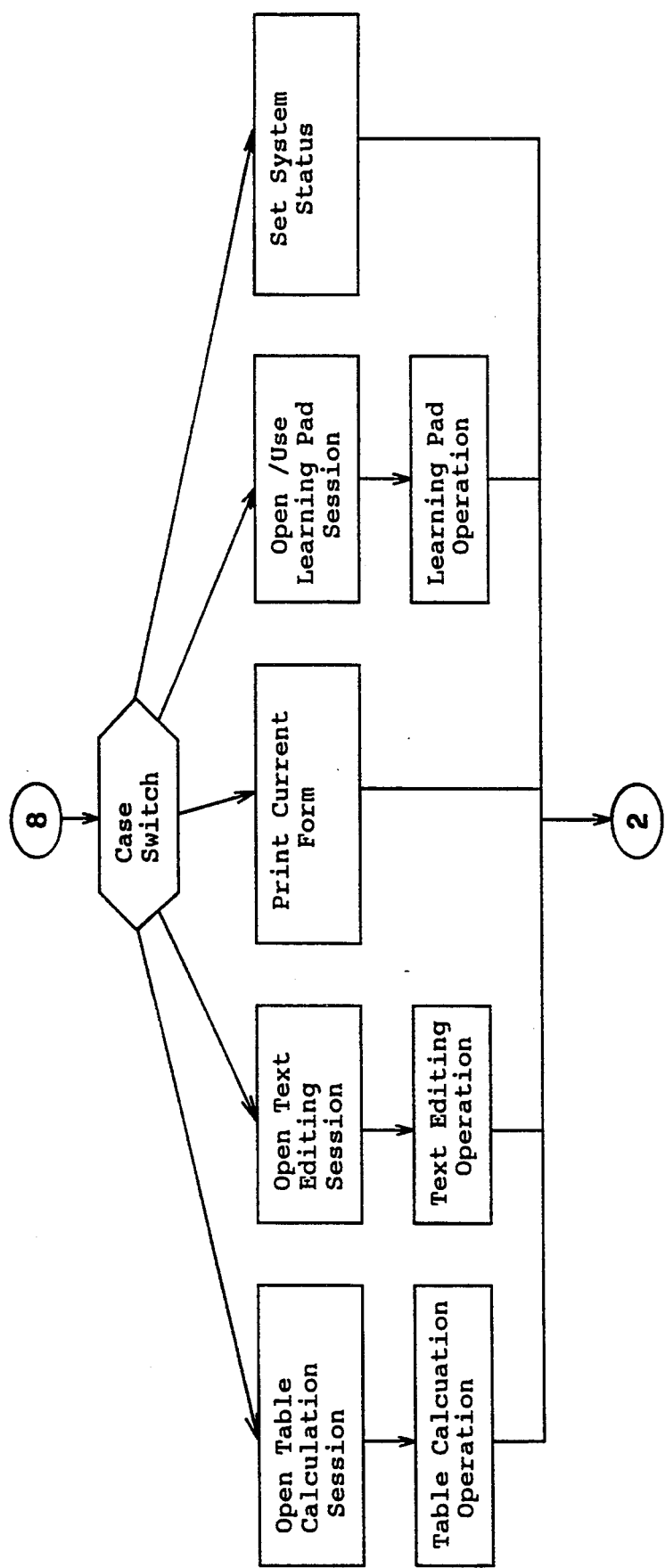
Figure 24:
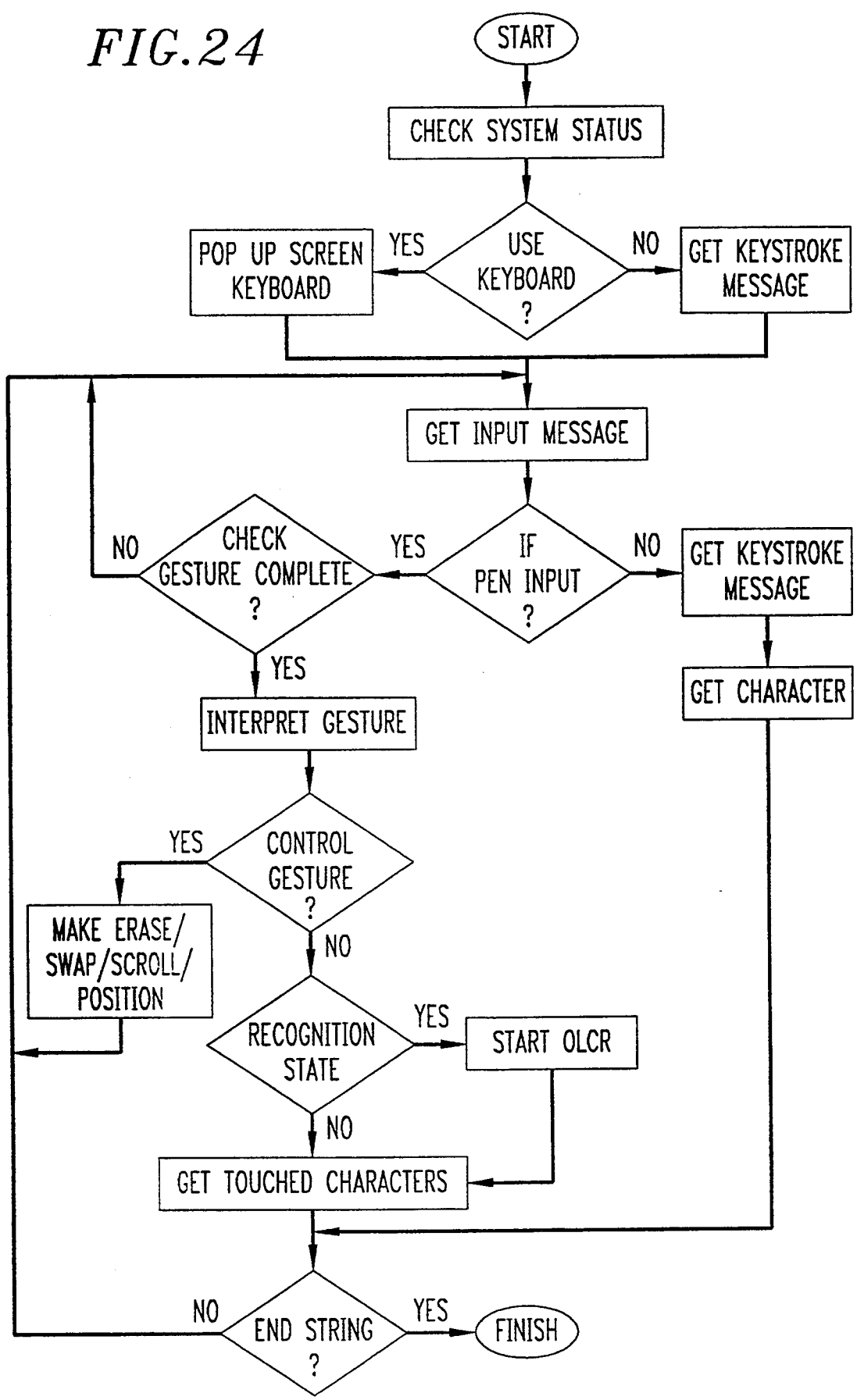
FIG. 24 is a flow chart of a Graphics/Test Recognition Unit according to the present invention.
Figure 25A:
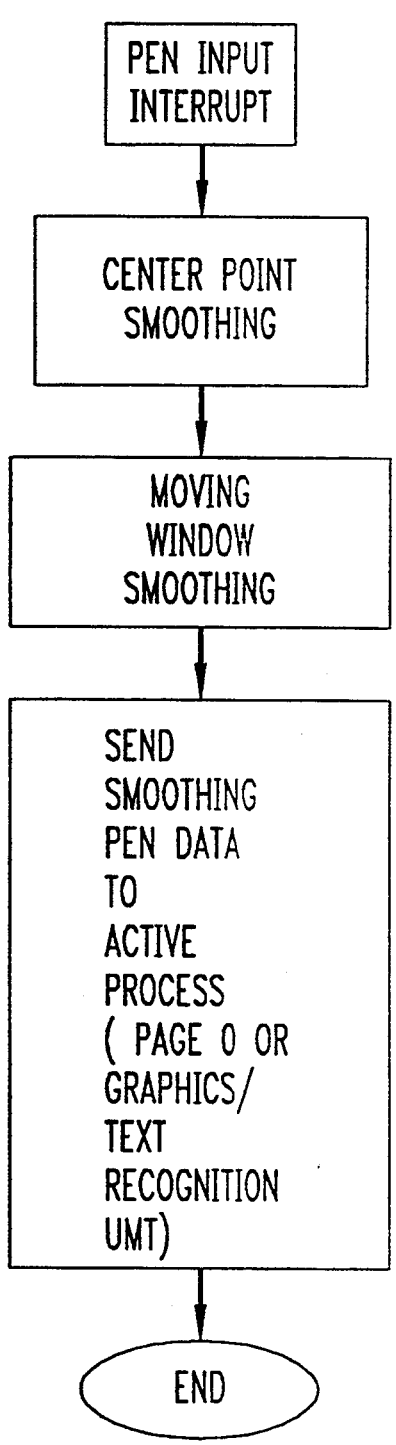
FIG. 25 is a flow chart of a Pen Input Device Unit according to the present invention.
Figure 25B:
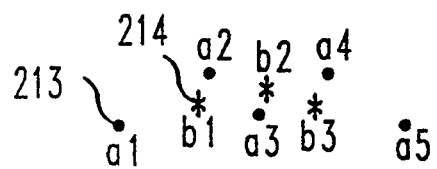
Figure 25C:
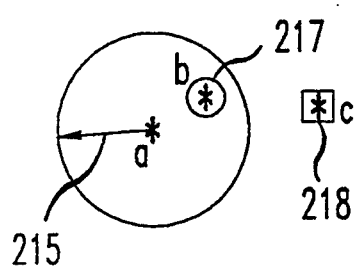
Figure 26:
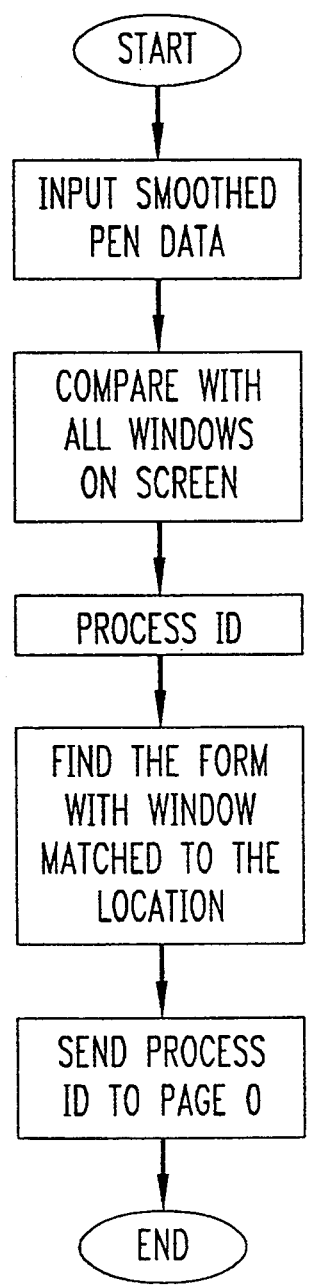
FIG. 26 is a flow chart of a Window Control Unit according to the present invention.
Figure 27A:
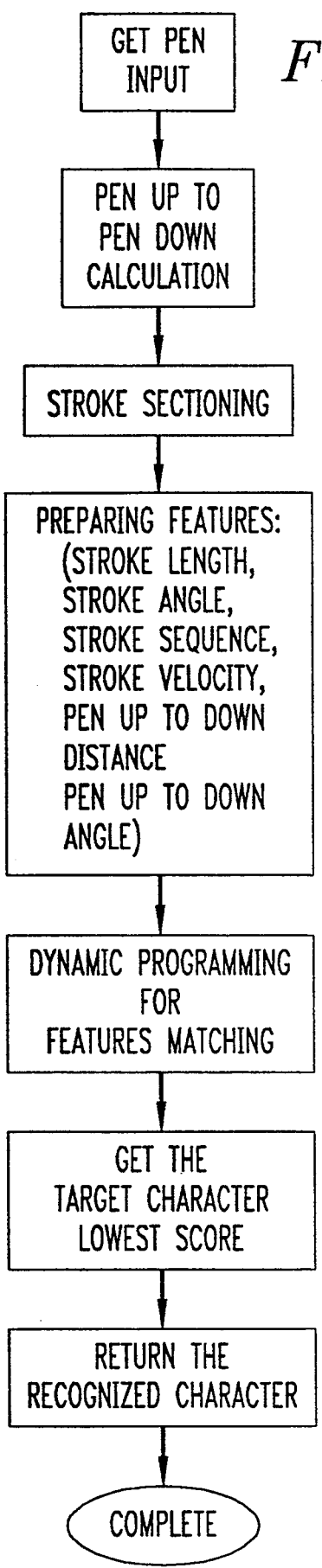
FIG. 27 is a flow chart of an OLCR according to the present invention.
Figure 27B:
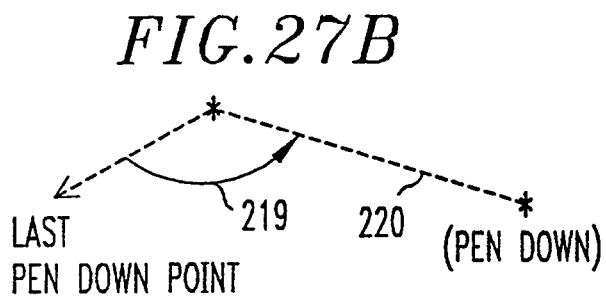
Figure 27C:
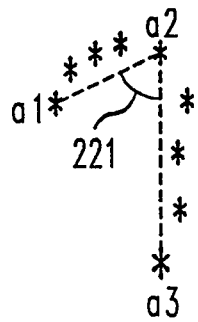
Figure 27D:
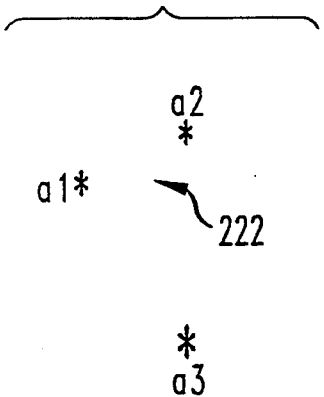

If a new form is required, the Form Making Unit 192 will produce a New Form 198 according to the procedures indicated in FIGS. 16, 17, 18 and 19, and then complete the step of automatical linking 199. As the system uses Form as operation object, a compact and high-performance system structure (FIG. 22) is imperative. FIG. 22 shows the linking of the processes concerned under a multitasking environment, in which the Form Processing Unit 185 is the execution and control center of the Form operation of main systems concerned which interprets every Script (SCP) Command (FIG. 23A), and transfers it to the related Utilities Unit 211, 209, 208 according to Form operation demands, so as to achieve On-line Inquiry (FIG. 23C), Data base Operation (FIG. 23D), File Management (FIG. 23E), Utilities (FIG. 23G) as demanded in Form. During the proceeding of these operations, user sees only Form operation (182 in FIG. 21). Therefore, any individual who lacks the knowledge of computer science can still operate the present pen-base form computer easily. Multiple forms are allowed to be used simultaneously. The Form Processing Unit 185 allows several processed to be existed at the same time. Because the system is designed through Context-free techniques (known techniques in computer programming), only one space for Form Processing Unit Code is needed in the system memory (64 in FIG. 9) when more than one Form Processing Unit 185 is existed. The Page 0 Unit 193 (see FIG. 22) finds out the form to be started from the Window Control Unit 194 or the Form Making Unit 192 by means of pen location. Upon receipt of the Process ID number, the Page 0 Unit 193 re-arrange the order for permitting the Form to be processed to appear for use. The related processing flow is shown in FIG. 26. The Graphics/Test Recognition Unit 196 is to process the input operation of the pen message according to the current input method (see FIGS. 12 and 13). When recognition is required, OLCR (FIG. 27) is then started. The related processing flow is shown in FIG. 24. Processed inputs (either through recognition or not) will then be sent back to the requester, namely, the Form Making Unit 192 or the Form Processing Unit 185 by the Graphics/Text Recognition Unit 196. The Pen Input Device Unit 205 is to process error correction on the original pen input location by means of Center Point Smoothing and Moving Window Smoothing (see FIG. 25). The Center Point Smoothing process is to take out three points al (as indicated at 213), a2, a3, then find out the center point b1 (as indicated at 214), and then start the Moving Window Smoothing process. The Moving Window Smoothing Process is to set a possible moving radius (as indicated at 215) from the last Pen Location a (as indicated at 216) so as to check the reasonability of the present movement. It is judged reasonable when located at a place covered within the radius 215, for example: at b 217. It is judged unreasonable and should be deleted when located at a place out of the radius 215, for example: at c 218. So far as Recognition is concerned (OLCR, FIG. 27), Pen Location provides more utilities for fast recognition. After the Pen Input process, it proceeds to the process of Pen Up to Pen Down Calculation which is done according to the angle 219 between the continuous Pen Locations and the distance to the next point 220. After the process of Pen Up to Pen Down Calculation, it enters the process of Stroke Sectioning to erase the unnecessary points in the recognition according to the critical angle 221, and maintain the Vertexes 222. Therefore, handwriting featuring is finished according to strokes' length, angle, sequence, velocity, Pen Up to Pen Down distance and angle; recognition cycle is finished by using a Dynamic Programming (a known computer algorithm) comparison method to find out the lowest score.

The aforesaid Pen Based Form Computer is to incorporate data base operation, file management operation, communication operation, application of utilities into a structure which uses forms as operation metaphor (FIGS. 21, 23A, 23B, 23C, 23D, 23E, 23F, 23G), and is controlled to operate by a pen through gestures (FIG. 11), and which can recognize handwriting characters (FIG. 27) for permitting the people who lack the knowledge of computer science to operate the computer easily. The ergonomic mechanic design and compact size and lightweight (FIGS. 2, 3, 4) make the Pen Based Form Computer convenient for operation anytime (FIG. 1).

While only the preferred embodiment of the present invention is disclosed, it is obvious to those skilled in the art that various changes and modifications could be made without departing from the scope of the invention as defined by the following claims.

What is claimed is:

1. A pen-base form computer comprising:
   a palm-top computer being compatible with personal computers on data and file format and operated through form control, said palm-top computer being capable of receiving data input through a hand-writing operation and being either for independent use or on-line operation with external computer mainframes;

a hand-writing display and input device comprising a touch control panel overlaid a LCD display to receive touch data or signals from a pen or the fingers;

a gesture control unit for controlling the operations of recognition, insert, delete, escape, alter, scroll up, scroll down, scroll left, scroll right;

a hand writing style training unit for recognition the user's writing style through a learning procedure to learn particular characters written by the user;

a form making unit to define port definition by making port geometry through gesture control and linking fixed format data field and free format field automatically without inputting any computer software program;

a form processing unit being to drive different form operations through a page zero unit via a window control unit according to different gestures, said form processing unit needing only one memory space for its executing code while processing multiple forms and comprising a graphic/text recognition unit to receive input data;

a pen input device unit being to obtain the non-distortion point by means of center point smoothing and moving window smoothing; and an on-line character recognition unit to recognize input characters according to stroke sectioning, stroke's length, angle, sequence, velocity, Pen Up to Pen Down distance and angle by means of the a Dynamic Programming.

2. The pen-base form computer of claim 1 which can be interconnected with different computer mainframes through infrared interfaces, radio frequency interfaces, modems or RS-232 connectors.

3. The pen-base form computer of claim 1 which comprises a built-in hand-writing style to facilitate recognition of hand-writing input characters.

4. The pen-base form computer of claim 1 which uses forms as operating media to synchronously process different operations by mean of a multi-tasking environment, according to the needs in executing the forms.

* * * * *